United States Patent
Díaz López et al.

(10) Patent No.: US 12,248,442 B2
(45) Date of Patent: Mar. 11, 2025

(54) DATABASE MODIFICATION USING A SCRIPT COMPONENT

(71) Applicant: QLIKTECH INTERNATIONAL AB, Lund (SE)

(72) Inventors: José Francisco Díaz López, Lund (SE); Björn Anders Wallin, Rydebäck (SE); Lars Martin Nilsson, Malmö (SE); Joaquin Durán Toro, Flyinge (SE)

(73) Assignee: QlikTech International AB, Lund (SE)

( * ) Notice: Subject to any disclaimer, the term of this patent is extended or adjusted under 35 U.S.C. 154(b) by 192 days.

(21) Appl. No.: 17/463,052

(22) Filed: Aug. 31, 2021

(65) Prior Publication Data

US 2023/0070159 A1    Mar. 9, 2023

(51) Int. Cl.
*G06F 16/00* (2019.01)
*G06F 16/21* (2019.01)
*G06F 16/242* (2019.01)
*G06F 16/25* (2019.01)
*G06F 16/28* (2019.01)

(52) U.S. Cl.
CPC ........ *G06F 16/213* (2019.01); *G06F 16/2423* (2019.01); *G06F 16/2433* (2019.01); *G06F 16/256* (2019.01); *G06F 16/258* (2019.01); *G06F 16/283* (2019.01); *G06F 16/285* (2019.01)

(58) Field of Classification Search
None
See application file for complete search history.

(56) References Cited

U.S. PATENT DOCUMENTS

| | | | | |
|---|---|---|---|---|
| 6,301,579 | B1 * | 10/2001 | Becker | G06F 16/287 707/999.102 |
| 7,315,517 | B2 * | 1/2008 | El-Amawy | H04L 45/12 398/55 |
| 7,487,172 | B2 * | 2/2009 | Bae | G06F 16/283 707/999.102 |
| 8,423,586 | B2 * | 4/2013 | Binstock | G06Q 40/02 707/803 |
| 10,599,635 | B1 * | 3/2020 | Gunn | G06F 16/258 |
| 10,628,401 | B2 * | 4/2020 | López | G06F 16/2272 |
| 10,706,356 | B1 * | 7/2020 | Doyle | G06N 3/08 |

(Continued)

FOREIGN PATENT DOCUMENTS

| | | | | | |
|---|---|---|---|---|---|
| EP | 3617898 | A1 * | 3/2020 | ......... | G06F 16/2228 |
| EP | 4033373 | A1 * | 7/2022 | ......... | G06F 16/2282 |

OTHER PUBLICATIONS

A Distributed Multi-Dimensional Publications Management System, Tsung et al., (Year: 2008).*

(Continued)

*Primary Examiner* — Jean M Corrielus
(74) *Attorney, Agent, or Firm* — Ballard Spahr LLP

(57) ABSTRACT

Technologies are provided for database modification using a script component. In some embodiments, a method comprises executing, by a computing system comprising at least one processor, a script component comprising one or more functions to transform a database. The method also includes modifying, by the computing system, the database based on at least one transformation defined by the one or more functions in response to executing the script component.

20 Claims, 24 Drawing Sheets

(56) References Cited

U.S. PATENT DOCUMENTS

| | | | | |
|---|---|---|---|---|
| 11,093,473 B2* | 8/2021 | Hedberg | ............. | G06F 16/2264 |
| 2003/0065632 A1* | 4/2003 | Hubey | .................... | G06F 18/23 |
| | | | | 706/15 |
| 2003/0218989 A1* | 11/2003 | El-Amawy | ............. | H04L 45/06 |
| | | | | 370/255 |
| 2006/0200439 A1* | 9/2006 | Bhatia | .................... | G06F 16/86 |
| 2006/0200499 A1* | 9/2006 | Bhatia | .................... | G06F 16/86 |
| 2006/0200753 A1* | 9/2006 | Bhatia | .................... | G06F 16/86 |
| | | | | 715/203 |
| 2008/0307386 A1* | 12/2008 | Chen | .................. | G06F 11/1471 |
| | | | | 717/109 |
| 2009/0006146 A1* | 1/2009 | Chowdhary | ........... | G06Q 10/10 |
| | | | | 705/7.11 |
| 2010/0250566 A1* | 9/2010 | Paul | ...................... | G06F 16/283 |
| | | | | 707/756 |
| 2010/0318494 A1* | 12/2010 | Val | ........................ | G06F 16/213 |
| | | | | 707/E17.005 |
| 2011/0258167 A1* | 10/2011 | Binstock | ................ | G06Q 40/02 |
| | | | | 707/804 |
| 2011/0276396 A1* | 11/2011 | Rathod | ............. | G06Q 30/0282 |
| | | | | 707/706 |
| 2015/0088902 A1* | 3/2015 | Nilsson | ............... | G06F 16/2272 |
| | | | | 707/756 |
| 2015/0370852 A1* | 12/2015 | Shastry | ................. | G06F 16/283 |
| | | | | 707/722 |
| 2016/0034498 A1* | 2/2016 | Fan | ....................... | G06F 16/213 |
| | | | | 707/803 |
| 2016/0042013 A1* | 2/2016 | Fan | ....................... | G06F 16/283 |
| | | | | 707/792 |
| 2016/0063107 A1* | 3/2016 | Schukovets | ......... | H04L 67/1097 |
| | | | | 707/770 |
| 2017/0220640 A1* | 8/2017 | López | ................. | G06F 3/04842 |
| 2018/0004805 A1* | 1/2018 | Potter | .................... | G06F 16/22 |
| 2018/0018335 A1* | 1/2018 | Wang | ........................ | G06F 7/08 |
| 2018/0232457 A1* | 8/2018 | L0pez et al. | .......... | G06F 16/278 |
| 2018/0329934 A1* | 11/2018 | Nilsson | ................ | G06F 16/2264 |
| 2018/0330007 A1* | 11/2018 | Lopez et al. | .......... | G06F 16/901 |
| 2019/0243865 A1* | 8/2019 | Rausch | ................. | G06F 16/907 |
| 2019/0324953 A1* | 10/2019 | Hedberg | ............. | G06F 16/2246 |
| 2020/0192883 A1* | 6/2020 | López | ................. | G06F 16/2228 |
| 2020/0218735 A1* | 7/2020 | Nilsson | .................... | G06F 16/56 |
| 2021/0089558 A1* | 3/2021 | Satoor | ................... | G06F 16/283 |
| 2021/0311963 A1* | 10/2021 | Dowler | ................ | G06F 16/283 |

OTHER PUBLICATIONS

International Search and Written Opinion dated Jan. 2, 2023 by the Searching Authority for PCT/EP2020/074233, filed Aug. 31, 2022 (Applicant—QlikTech, Inc.) (12 pages).

* cited by examiner

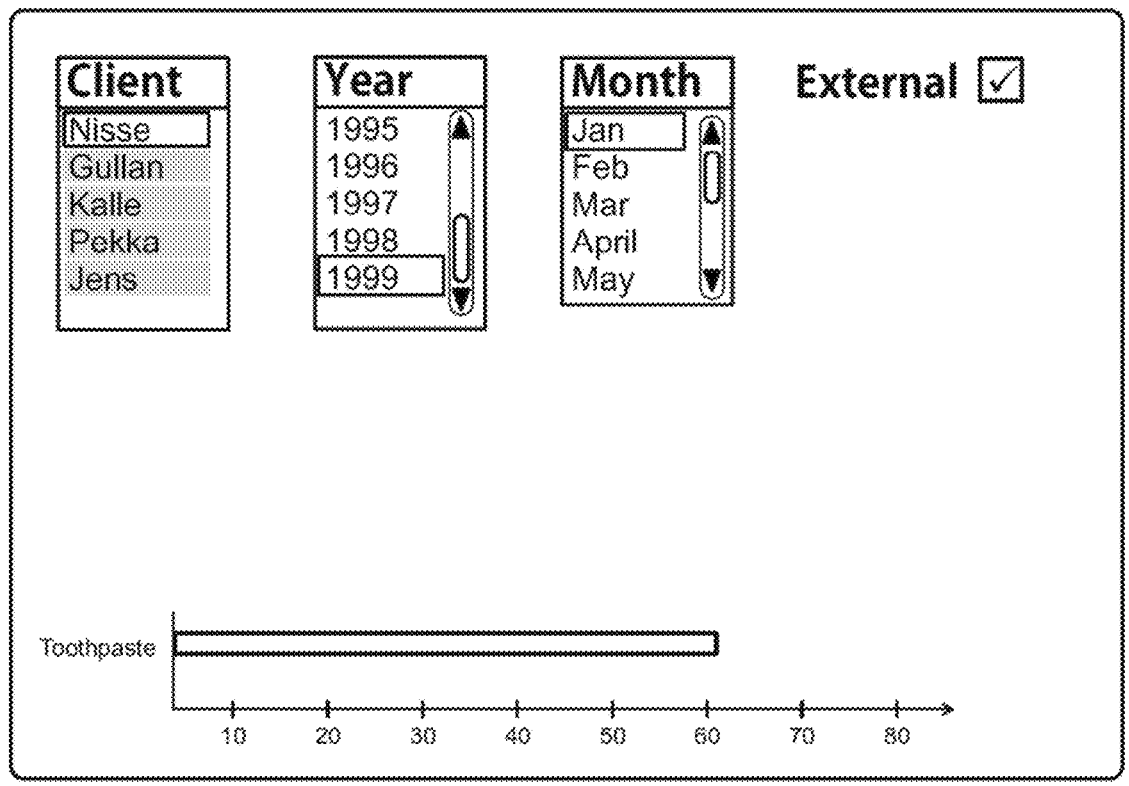

FIG. 10
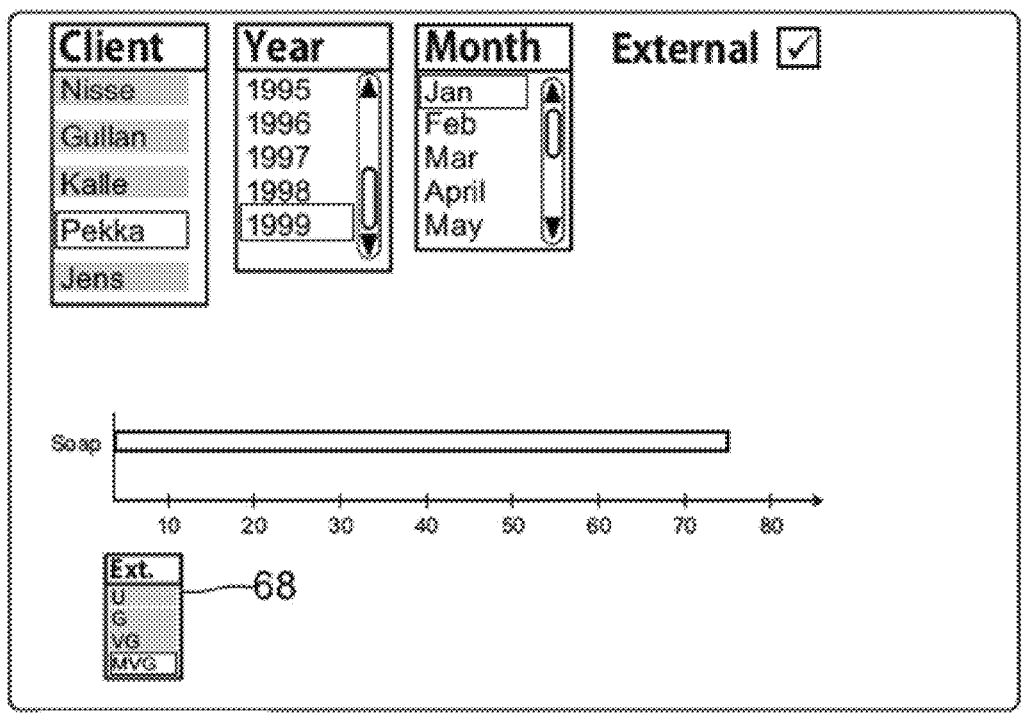
FIG. 11
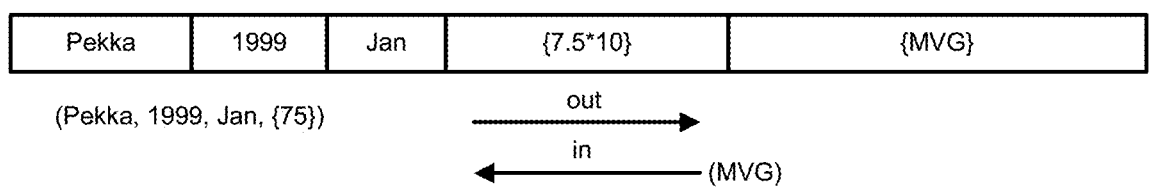
FIG. 12
| Client | Year | Month | Sum(Price*Number) | ExtQualification(Sum(Price*Number)) |
|---|---|---|---|---|
| Nisse | 1999 | Jan. | 19.5 | G |
| Kalle | 1999 | Jan. | 60 | VG |
| Gullan | 1999 | Jan. | 37.5 | VG |
| Jens | - | - | - | U |
| Pekka | 1999 | Jan. | 75 | MVG |

Script

1730

For J = 0 to 5

Put FDD(J) = (Sum_exp1(J+1) – Sum_exp1(J)) / (Num(J+1) – Num(J));

next

FIG. 17B

Script

1760

For J = 0 to 10

Put SimpsonRule(J+1) = (Sum_exp1(J+1) + 4*Sum_exp1(J)+Sum_exp1(J-1)) / 6 / (Num(J+1) – Num(J));

next

FIG. 17C

```
add load
*
inline
[
$F1, $F2
$VAL1, $VAL1
$VAL2, $VAL2
$VAL3, $VAL3
];

Put Decoupled m, b, Forecast = (LinEst_m($Target1,$F1),LinEst_b($Target1,$F1,1))

Load
*,
m*x+b as Forecast
From PrimaryCube
```

DATABASE MODIFICATION USING A SCRIPT COMPONENT

SUMMARY

It is to be understood that both the following general description and the following detailed description are exemplary and explanatory only and are not restrictive, as claimed. Provided are methods and systems for undetermined query analytics.

Embodiments of this disclosure, individually or in combination, permit modifying or creating a database using a data structure script component. In some embodiments, a method comprises executing, by a computing system comprising at least one processor, a script component comprising one or more functions to transform a database. The method also includes modifying, by the computing system, the database based on at least one transformation defined by the one or more functions in response to executing the script component. The database can be defined from an extant hypercube, by selecting at least one dimension and/or at least one measure from the extant hypercube. The defined database is itself a hypercube. Thus, the transformation of the database can be specific to the database, and represents a form of postprocessing of the database rather than a modification of the extant hypercube used to define the database.

Implementation of embodiments of this disclosure provide several improvements over conventional technologies, such as extract-transform-load (ETL) pipelines. An example improvement includes reducing the use of computing resources, such as compute time and/or network bandwidth, while modifying and generating databases. Indeed, in sharp contrast to a conventional ETL pipeline, embodiments of this disclosure avoid authentication and outer join operations commonly performed in a ETL pipeline. Thus, embodiments described herein mitigate (or entirely avoid) the implementation of time-intensive operations.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 8 is a schematic graphical presentation showing selections and a diagram of data associated to the selections as received after second computations from an external engine;

FIG. 9 is a schematic representation of data exchanged with an external engine based on selections in FIG. 8;

FIG. 10 is a schematic graphical presentation showing selections and a diagram of data associated to the selections as received after third computations from an external engine;

FIG. 11 is a schematic representation of data exchanged with an external engine based on selections in FIG. 10;

FIG. 12 is a table showing results from computations based on different selections in the presentation of FIG. 10;

FIG. 17B illustrates another example of a script that includes a control statement and array operations;

FIG. 17C illustrates yet another example of a script that includes a control statement and other array operations;

FIG. 19 illustrates an example of a script template;

DETAILED DESCRIPTION

Figure 1:
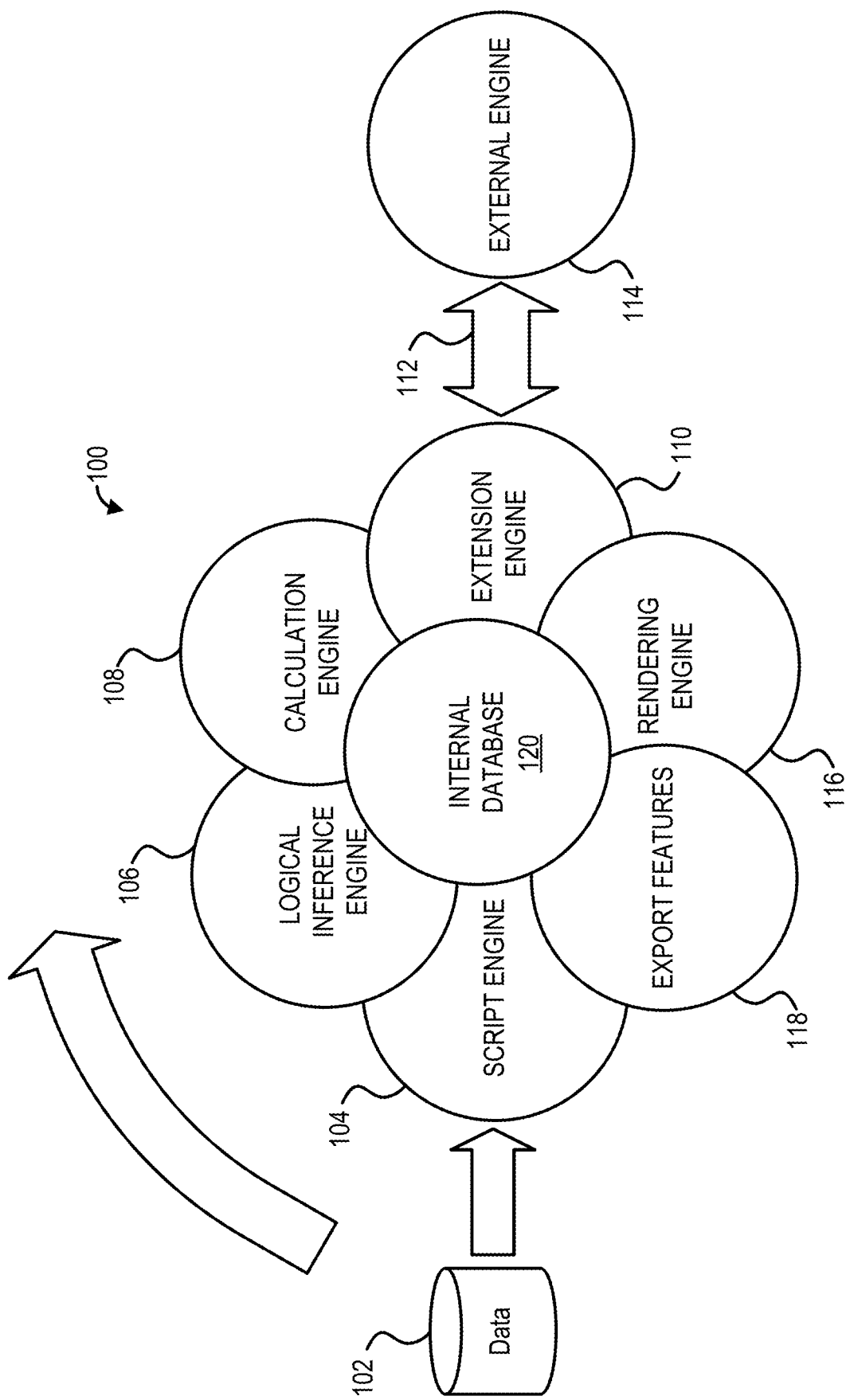
FIG. 1 is a schematic diagram showing an embodiment of a system forming an implementation of the disclosed methods.

Before the present methods and systems are disclosed and described in more detail, it is to be understood that the methods and systems are not limited to specific operations, processes, components, or structure described, or to the order or particular combination of such operations or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers, or operations. "Exemplary" means "an example of", but not essential, necessary, or restricted or limited to, nor does it convey an indication of a preferred or ideal embodiment. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that is exemplary.

Operations and components described herein as being used to perform the disclosed methods and construct the disclosed systems are exemplary unless the context clearly dictates otherwise. It is to be understood that when combinations, subsets, interactions, groups, etc. of these operations and components are disclosed, that while specific reference of each various individual and collective combinations and permutation of these may not be explicitly disclosed, each is specifically contemplated and described herein, for all methods and systems. This applies to all aspects of this application including, but not limited to, operations in disclosed methods and/or the components disclosed in the systems. Thus, if there are a variety of additional operations that can be performed or components that can be added, it is understood that each of these additional operations can be performed and components added with any specific embodiment or combination of embodiments of the disclosed systems and methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked, or cloud-based.

Embodiments of the methods and systems are described below with reference to diagrams, flowcharts, and other illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operations to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support combinations of means for performing the specified functions, combinations of operations for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

The present disclosure relates to modification and creation of databases using a script component. Embodiments of the disclosure can obtain a script component comprising one or more functions to modify a database or to create another database. The script component can be based on a script received from a user-device, where the script can be created using a graphical user interface. The graphical user interface also can be used to define the database to be modified. Embodiments of the disclosure can include one or several units that can execute the script component. In response to execution of the script component, the database can be modified based on at least one transformation defined by the function(s). In some cases, also in response to execution of the script component, a database can be created by operating on an extant database. Accordingly, in response to executing the script component, the database can be used as input for one or more transformations that lead to additional rows, additional columns, and/or additional databases.

FIG. 1 shows an example associative data indexing engine 100. The associative data indexing engine 100 may determine and/or generate a response to a query. The query may be, for example, an undetermined query (e.g., an imprecise query, an undefined query, an incomplete query, a partially expressed query, a portioned query, etc.). The associative data indexing engine 100 may analyze the query based on one or more novel aggregation functions, for example, aggregation functions that are qualified to operate on a subset of data records (e.g., rather than a current selection of data records and/or a total selection of data records, etc.) and output a response. The response may be, for example, a visualization and/or one or more data analysis models (e.g., data charts, data tables, data graphs, data maps, graphical objects, key performance indicators (KPIs), etc.) that best fit aggregated data associated with the query.

FIG. 1 shows the associative data indexing engine 100 with data flowing in from the left and operations starting from a script engine 104 and going clockwise (indicated by the clockwise arrow) to export features 118. Data from a data source 102 can be extracted by a script engine 104. The data source 102 can comprise any type of known database and/or data store, such as relational databases, post-relational databases, object-oriented databases, hierarchical databases, flat files, spreadsheets, etc. The Internet may also be regarded as a database in the context of the present disclosure. A visual interface can be used as an alternative or combined with a script engine 104. The script engine 104 can read record by record from the data source 102 and data can be stored or appended to symbol and data tables in an internal database 120. Read data can be referred to as a dataset.

In an aspect, the extraction of the data can comprise extracting an initial dataset or scope from the data source 102, e.g. by reading the initial dataset into the primary memory (e.g. RAM) of a computer. The initial dataset can comprise the entire contents of the data source 102, or a subset thereof. The internal database 120 can comprise the extracted data and symbol tables. Symbol tables can be created for each field and, in one aspect, can only contain the distinct field values, each of which can be represented by their clear text meaning and a bit filled pointer. The data tables can contain said bit filled pointers.

In the case of a query of the data source 102, a scope can be defined by the tables included in a SELECT statement (or equivalent) and how these are joined. In an aspect, the SELECT statement can be SQL (Structured Query Language) based. For an Internet search, the scope can be an index of found web pages, for example, organized as one or more tables. A result of scope definition can be a dataset.

Once the data has been extracted, a user interface can be generated to facilitate dynamic display of the data. By way of example, a particular view of a particular dataset or data subset generated for a user can be referred to as a state space or a session. Embodiments of this disclosure can dynamically generate one or more visual representations of the data to present in the state space.

A user can make a selection in the dataset, causing a logical inference engine 106 to evaluate a number of filters on the dataset. For example, a query on a database that holds data of placed orders, could be requesting results matching an order year of '1999' and a client group be 'Nisse.' The selection may thus be uniquely defined by a list of included fields and, for each field, a list of selected values or, more generally, a condition. Based on the selection, the logical inference engine 106 can generate a data subset that represents a part of the scope. The data subset may thus contain a set of relevant data records from the scope, or a list of references (e.g. indices, pointers, or binary numbers) to these relevant data records. The logical inference engine 106 can process the selection and can determine what other selections are possible based on the current selections. In an aspect, flags can enable the logical inference engine 106 to work out the possible selections. By way of example, two flags can be used: the first flag can represent whether a value is selected or not, the second flag can represent whether or not a value selection is possible. For every click in an application, states and colors for all field values can be calculated. These can be referred to as state vectors, which can allow for state evaluation propagation between tables.

The logical inference engine 106 can utilize an associative model to connect data. In the associative model, all the fields in the data model have a logical association with every other field in the data model. An example, data model 501 is shown in FIG. 5B. The data model 501 illustrates connections between a plurality of tables that represent logical associations. Depending on the amount of data, the data model 501 can be too large to be loaded into memory. To address this issue, the logical inference engine 106 can generate one or more indexes for the data model. The one or more indexes can be loaded into memory instead of the data model 501. The one or more indexes can be used as the associative model. An index is used by database management programs to provide quick and efficient associative access to a table's records. An index is a data structure (for example, a B-tree, a hash table, and the like) that stores attributes (e.g., values) for a specific column in a table. A B-tree is a self-balancing tree data structure that keeps data sorted and allows searches, sequential access, insertions, and deletions in logarithmic time. The B-tree is a generalization of a binary search tree in that a node can have more than two children. A hash table (also referred to as a hash index) can comprise a collection of buckets organized in an array. A hash function maps index keys to corresponding buckets in the hash index.

Figure 2:
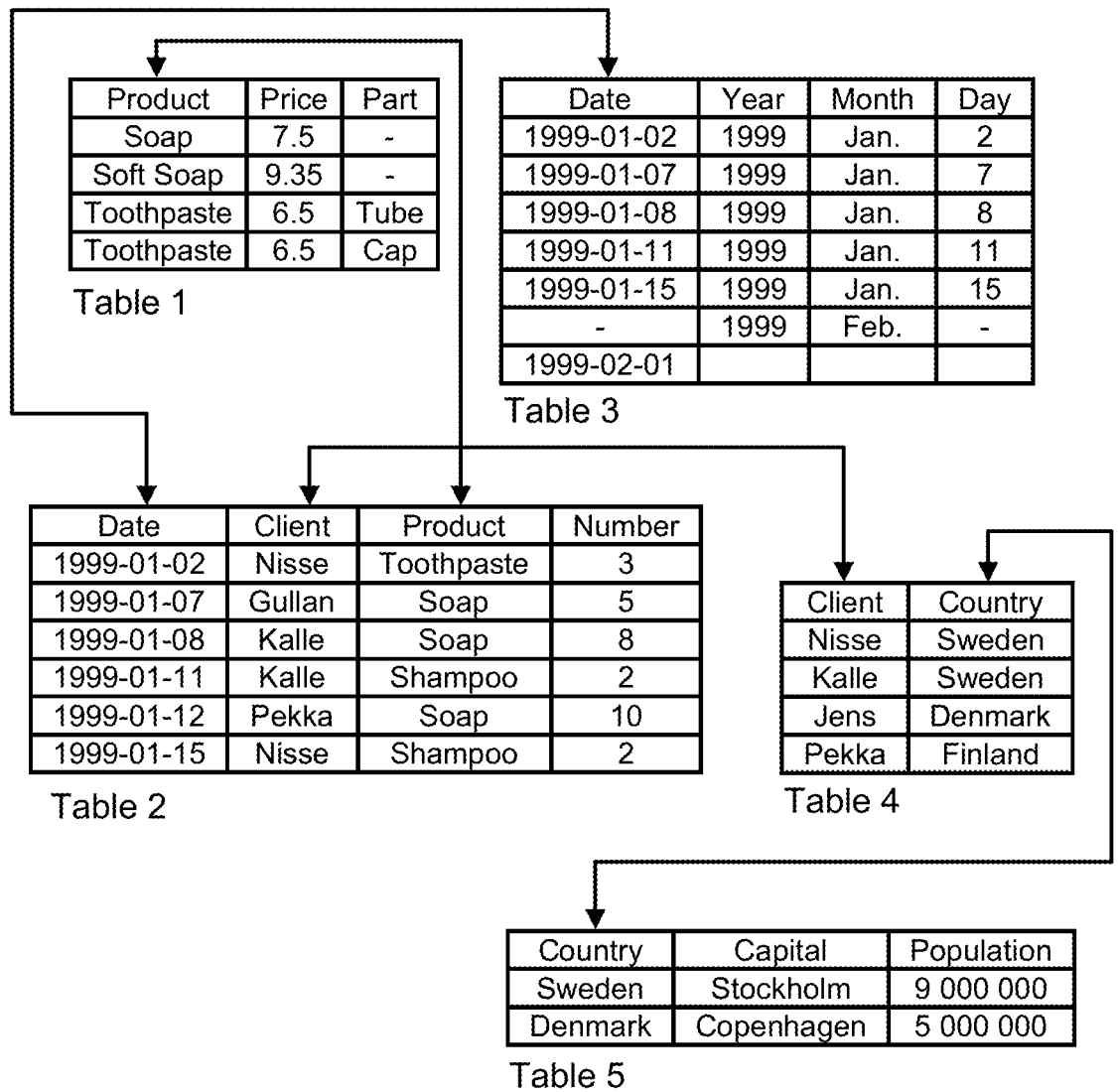
FIG. 2 is a set of tables showing exemplary Tables 1-5 of a simple database and associations between variables in the tables.

An example database, as shown in FIG. 2, can comprise a number of data tables (Tables 1-5). Each data table can contain data values of a number of data variables. For example, in Table 1 each data record contains data values of the data variables "Product," "Price," and "Part." If there is no specific value in a field of the data record, this field is considered to hold a NULL-value. Similarly, in Table 2 each data record contains values of the variables "Date," "Client," "Product," and "Number." In Table 3 each data record contains values of variable "Date" as "Year," "Month" and "Day." In Table 4 each data record contains values of variables "Client" and "Country," and in Table 5 each data record contains values of variables "Country," "Capital," and "Population." Typically, the data values are stored in the form of ASCII-coded strings, but can be stored in any form.

Queries that compare for equality to a string can retrieve values very fast using a hash index. For instance, referring to the tables of FIG. 2, a query of SELECT*FROM Table 2 WHERE Client='Kalle' could benefit from a hash index created on the Client column. In this example, the hash index would be configured such that the column value will be the key into the hash index and the actual value mapped to that key would just be a pointer to the row data in Table 2. Since a hash index is an associative array, a typical entry can comprise "Kalle=>0x29838", where 0x29838 is a reference to the table row where Kalle is stored in memory. Thus, looking up a value of "Kalle" in a hash index can return a reference to the row in memory which is faster than scanning Table 2 to find all rows with a value of "Kalle" in the Client column. The pointer to the row data enables retrieval of other values in the row.

As shown in FIG. 5B, the logical inference engine 106 can be configured for generating one or more bidirectional table indexes (BTI) 502a, 502b, 502c, 502d, and/or 502e and one or more bidirectional associative indexes (BAI) 503a, 503b, 503c and/or 503d based on a data model 501. The logical inference engine 106 can scan each table in the data model 501 and create the BTI 502a, 502b, 502c, 502d, and/or 502e. A BTI can be created for each column of each table in the data. The BTI 502a, 502b, 502c, 502d, and/or 502e can comprise a hash index. The BTI 502*a*, 502*b*, 502*c*, 502*d*, and/or 502*e* can comprise first attributes and pointers to the table rows comprising the first attributes. For example, referring to the tables of FIG. 2, an example BTI 502*a* can comprise "Kalle=>0x29838", where Kalle is an attribute found in Table 2 and 0x29838 is a reference to the row in Table 2 where Kalle is stored in memory. Thus, the BTI 502*a*, 502*b*, 502*c*, 502*d*, and/or 502*e* can be used to determine other attributes in other columns (e.g., second attributes, third attributes, etc.) in table rows comprising the first attributes. Accordingly, the BTI can be used to determine that an association exists between the first attributes and the other attributes.

The logical inference engine 106 can scan one or more of BTI 502*a*, 502*b*, 502*c*, 502*d*, and/or 502*e* and create the BAI 503*a*, 503*b*, 503*c* and/or 503*d*. The BAI 503*a*, 503*b*, 503*c*, and/or 503*d* can comprise a hash index. The BAI 503*a*, 503*b*, 503*c*, and/or 503*d* can comprise an index configured for connecting attributes in a first table to common columns in a second table. The BAI 503*a*, 503*b*, 503*c*, and/or 503*d* thus allows for identification of rows in the second table which then permits identification of other attributes in other tables. For example, referring to the tables of FIG. 2, an example BAI 503*a* can comprise "Kalle=>0x39838", where Kalle is an attribute found in Table 2 and 0x39838 is a reference to a row in Table 4 that contains Kalle. In an aspect, the reference can be to a hash that can be in-memory or on disk.

Using the BTI 502*a*, 502*b*, 502*c*, 502*d*, and/or 502*e* and the BAI 503*a*, 503*b*, 503*c*, and/or 503*d*, the logical inference engine 106 can generate an index window 504 by taking a portion of the data model 501 and mapping it into memory. The portion of the data model 501 taken into memory can be sequential (e.g., not random). The result is a significant reduction in the size of data required to be loaded into memory.

In an aspect, bidirectional indexing using BTIs can have limits as to how much parallelization can be applied when processing the data model 501. To improve parallelization applied to the data model 501, the logical inference engine 106 can generate bidirectional indexes for partitions for a table in the data model 501. Such bidirectional indexes are hereinafter referred to as "indexlets." In an aspect, the logical inference engine 106 can generate indexlets for a given table by partitioning the table into blocks of rows. In an aspect, the blocks of rows can be of a same size. In an aspect, a last block of rows can be of a size less than the remaining blocks of rows. In an aspect, after partitioning the blocks of rows, the logical inference engine can generate an indexlet for each of the blocks of rows. In an aspect, generating an indexlet for a given block of rows comprises generating a bidirectional index as described above, but limited in scope to the given block of rows.

Provided the input data sources, the logical inference engine 106 can implement an indexation process (e.g., symbol indexation) to generates the indexlets. Indexlets thus generated can serve as a foundation for providing bi-directional indexing information for the both inferencing and/or hypercube domain calculation techniques.

Given an input data source 102 in an interpretable format, e.g., CSV, the indexation process can begin with partitioning the data source 102 into disjoint, same-sized blocks of rows. In some aspects, the indexation process will not partition the last row (e.g., the size of the last block might be smaller than the size of the other blocks). These "slices" of the data can be then processed independently to generate intermediate indexlet structures. Intermediate indexlet structures can be processed sequentially to generate a global symbol map. In addition to bi-directional information (symbol to row and row to symbol), a mapping between the symbols can reside locally in the indexlet and in the global symbol map. This mapping enables a simple yet fast and efficient transformation between symbols in an indexlet and in global symbol maps and vice versa through select and rank operations on bit vectors.

There are two main challenges to the indexation process: parallelization of the creation of intermediate indexlet structures and the creation and handling of large global symbol maps that contain potentially billions of symbols.

The indexation process can be divided into two components: an indexer service and a global symbol service. While the indexer service handles an indexation request as well as distributing tasks of creating the intermediate indexlet structures, the global symbol service enables splitting global symbol maps across machines. Even in good hash map implementations, there is always overhead in memory consumption due to the management of the internal data structure. As result, the ability to split global symbol maps across machines helps to share the load as well as supporting both horizontal and vertical scaling when dealing with large dataset.

To achieve the maximum parallelization of the creation of intermediate indexlet structures, the indexer service can utilize a distributed computing environment. A master node can comprise information regarding the capability of worker nodes registered during their initialization. On receiving an indexation request, the master node distributes tasks to worker nodes based on the registered capability. In this setup, more worker nodes can be dynamically added and registered with the master node to reduce the required creation time of the intermediate indexlet structures. Moreover, if a worker node dies during the process, a new worker node can be instantiated and registered to the master node to take over the corresponding tasks. The master node can also communicate with a global symbol master node to get global symbol maps initialized and ready for the global symbol service.

When dealing with large datasets, global symbol maps can comprise billions of symbols. Naturally, an in-memory hash map can provide better performance on both look up and insert operations in comparison to file-based hash map implementations. Unfortunately, it is not practical to have an unlimited amount of physical memory available. Although virtual memory can help to elevate the limitation of physical memory, the performance of lookup and insert operations degrades dramatically.

A global symbol service is provided in which global symbol maps are split across machines to share the load as well as the stress on memory requirements while achieving the desired performance.

Figure 4:
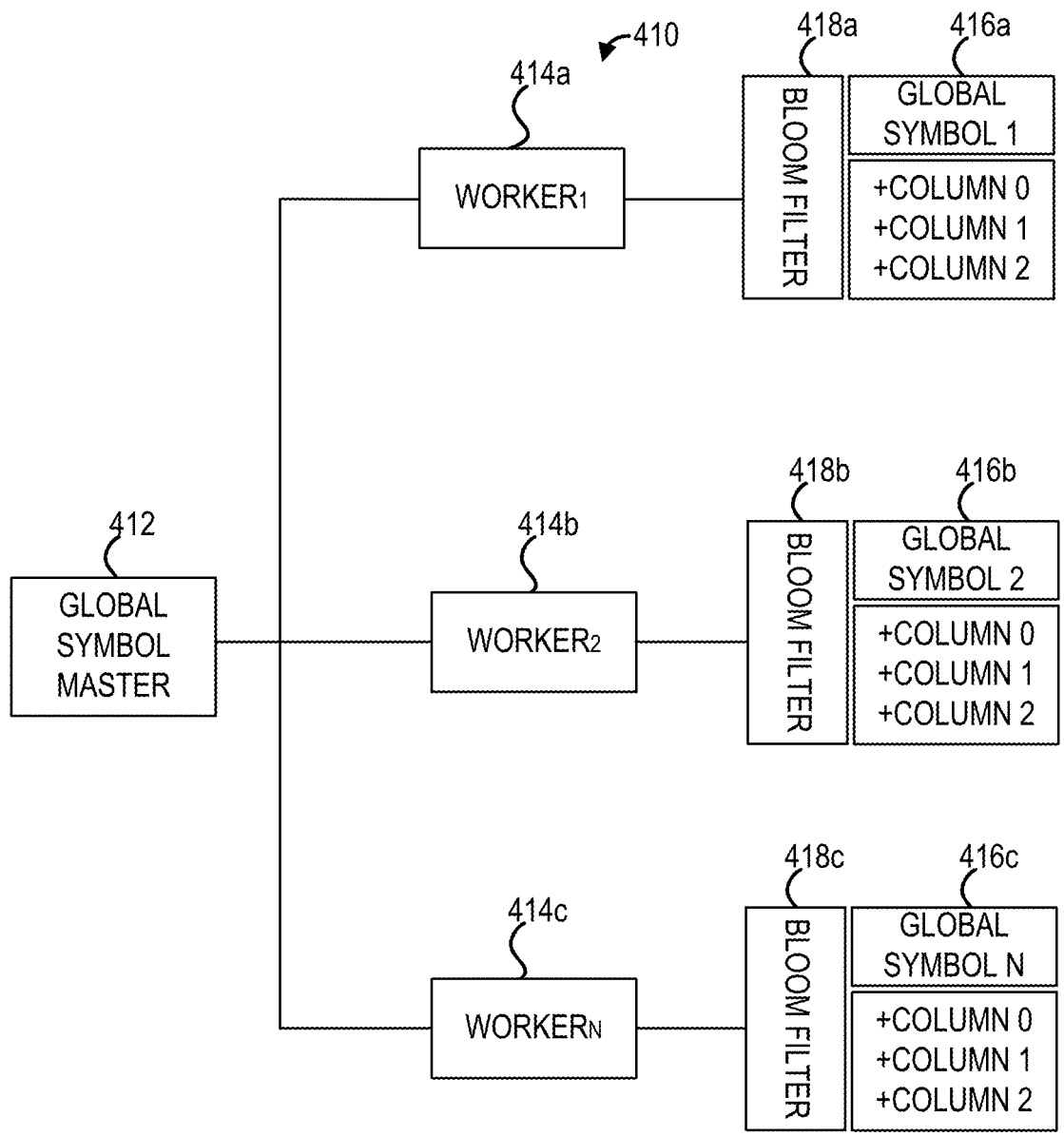
FIG. 4 illustrates an example global symbol service.

FIG. 4 illustrates a global symbol service 410. During an initialization process, worker nodes 414*a*, 414*b*, and 414*c* register their capabilities, e.g., amount of memory, processing power, bandwidth, etc., with a global master node 412. On receiving an indexation request, for example from the indexer master node 402, the global symbol master node 412 can request initialization of global symbol maps 416*a*, 416*b*, and 416*c* on worker nodes 414*a*, 414*b*, and 414*c* based on the registered capabilities. As a result, the global symbol maps 416*a*, 416*b*, and 416*c* are initialized, and proper capability is reserved accordingly.

The indexer service and the global symbol service can generate intermediate indexlet structures and process the intermediate indexlet structures sequentially to generate the global symbol maps together with bi-directional indexing information. This constraint on processing order permits fast and efficient mappings between symbols that reside locally in an indexlet and the global symbol maps. The global symbol service allows parallelism to improve indexation performance.

For example, a state, S, can be introduced into the global symbol maps 416a, 416b, and 416c on the worker nodes 414a, 414b, and 414c as follows S={standing_by, serving, closed} where "standing_by" indicates that the global symbol map on the worker node is not in use, "serving" indicates that the global symbol map on the worker node can be used for both lookup and insert operations, "closed" indicates that the global symbol map on the worker node is full, and, thus, only supports a lookup operation.

The creation of the global symbol map can start with inserting symbols into a serving hash map on the corresponding worker node. When the optimal capacity of the hash map is reached, the corresponding worker node informs the global symbol master node and changes its state to closed. The global symbol master node can then request another worker node to handle the upcoming tasks, e.g., changing the state of a hash map from "standing_by" to "serving." On subsequent processes, lookup operations can be carried out in a bulk and in a parallelized manner on a closed hash map to maximize the performance. The remaining new symbols can then be inserted into the serving hash map on the corresponding worker node. If a worker node in "standing_by" state dies during the process, it can be replaced by instantiating another worker node that registers itself to the master node. If a worker node in "closed" or "serving" state dies, it can be replaced by either another worker node in "standing_by" state or a newly instantiated worker node. In this case, the master node informs the indexer service and the range of the corresponding data will be indexed again to reconstruct the corresponding hash map.

In an aspect, a Bloom filter 418a, 418b, and 418c can be used to further optimize lookup performance. A Bloom filter is a probabilistic data structure that can indicate whether an element either definitely is not in the set or may be in the set. In other words, false-positive matches are possible, but false negatives are not. The base data structure of a Bloom filter is a bit vector. On a very large hash map that contains several billion symbols, the performance of the lookup operation can degrade dramatically as the size increases. The Bloom filter is a compact data structure that can represent a set with an arbitrarily large number of elements. The Bloom filter enables fast querying of the existence of an element in a set. Depending on the registered resource information, the false positive rate can be specified to achieve both the compactness of the Bloom filter and the minimum access to the hash map. A Bloom filter can improve the performance of lookup operation on closed hash map by 3 to 5 times. The constructed Bloom filter 418a, 418b, and 418c can be used to minimize the amount of communication required in the inferencing as well as hypercube domain construction process. Particularly, by performing lookup operations in the Bloom filters 418a, 418b, and 418c first, the number of hash maps that possibly contain the desired information will be minimized, and, thus, reduce the number of requests that need to be transferred through the network.

The indexer service and the global symbol service allows both local as well as cloud-based deployment of symbol indexation. With the cloud-based deployment, more resources can be added to improve the indexation process. The indexation process is bounded by the amount of resources and the available bandwidth. In large-scale deployment, direct communication between indexer worker nodes 404a, 404b, and 404c and global symbol worker nodes 414a, 414b, and 414c can be setup to reduce the load on the global symbol master node 412.

Figure 5A:
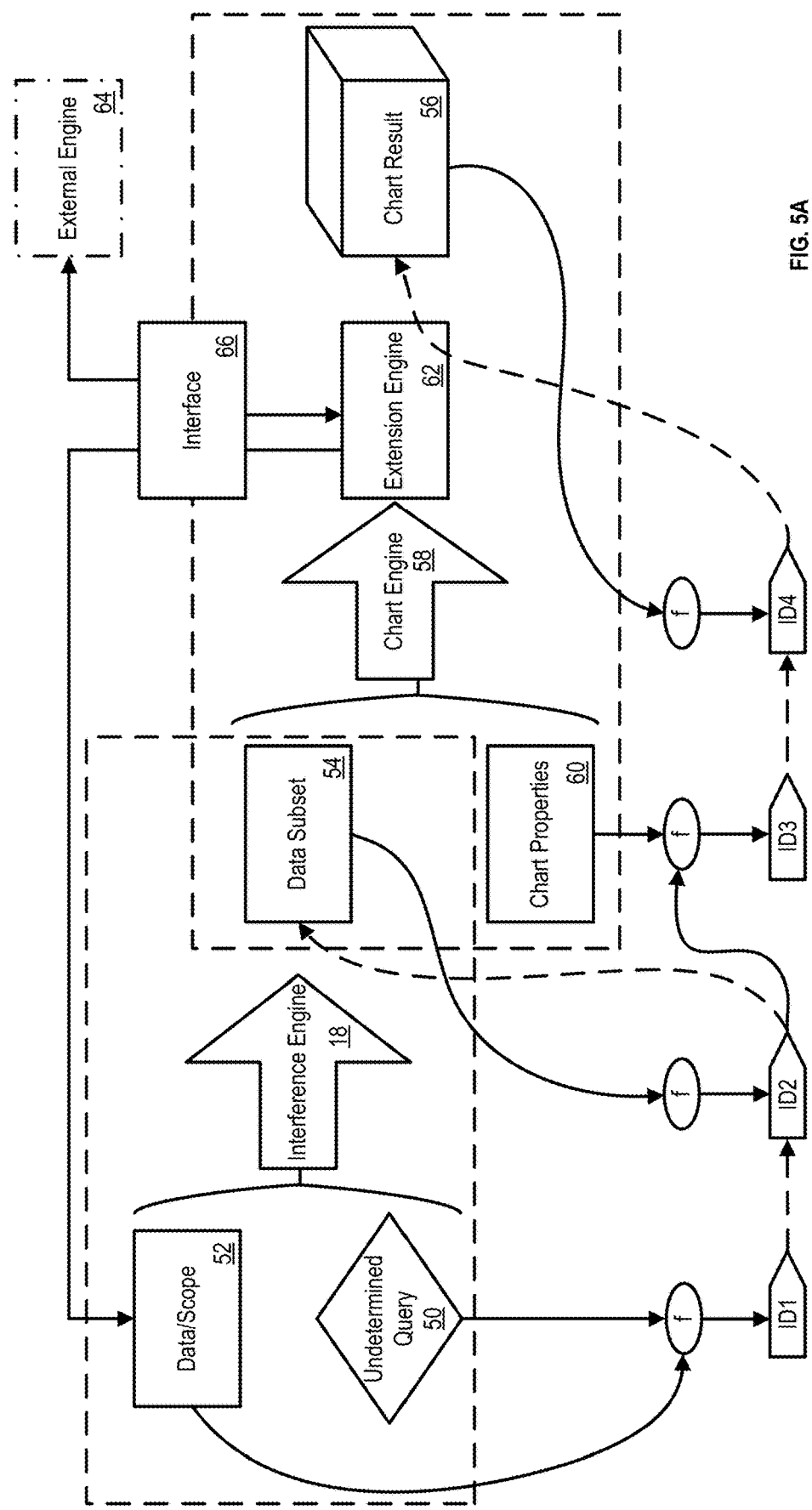
FIG. 5A is a schematic diagram showing how an undetermined query operates on a scope to generate a data subset.
Figure 5B:
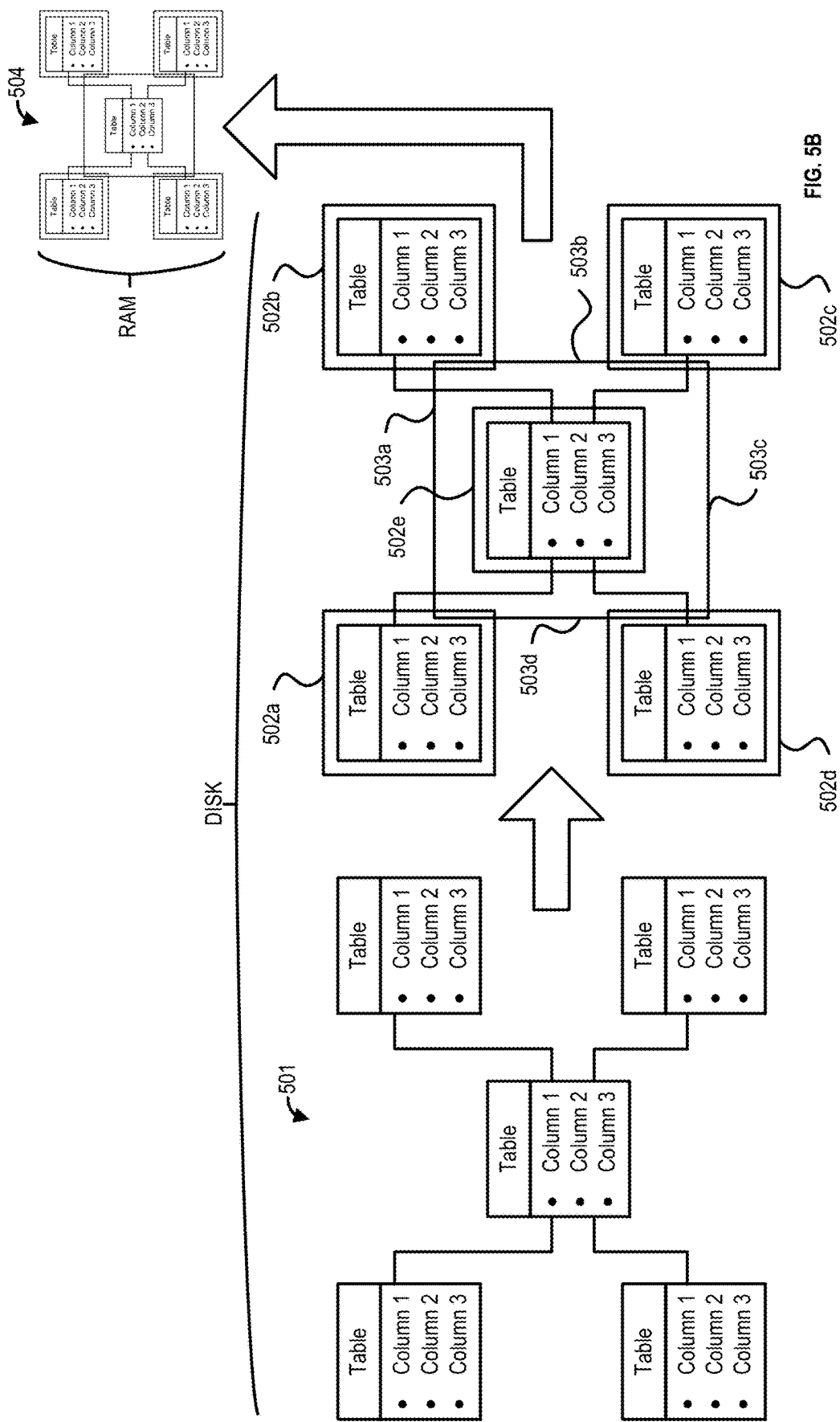
FIG. 5B is an overview of the relations between data model, indexes in disk and windowed view of disk indexes in memory.
Figure 5C:
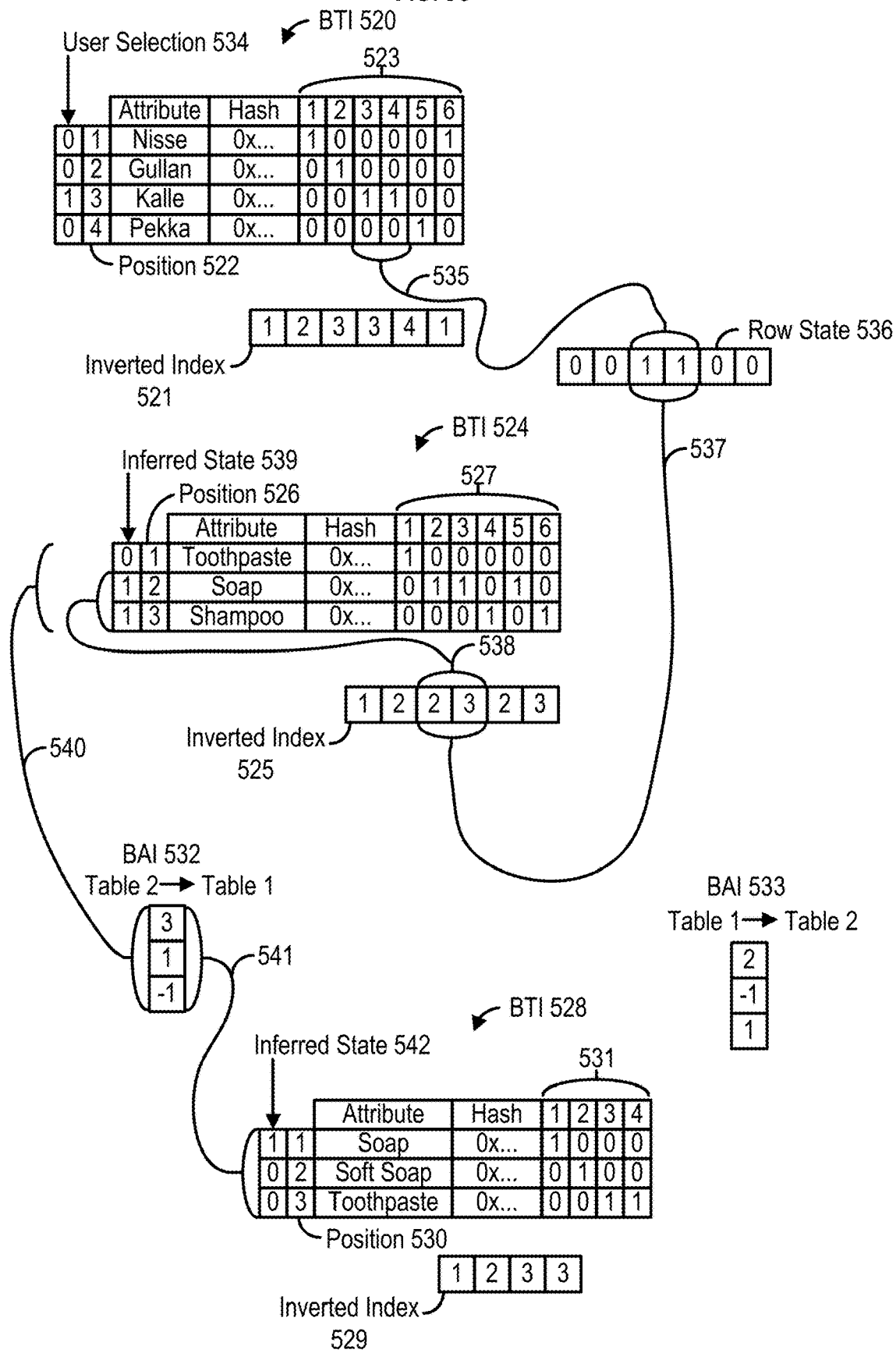
FIG. 5C illustrates an example application of bidirectional table indexes and bidirectional association indexes.
Figure 5D:
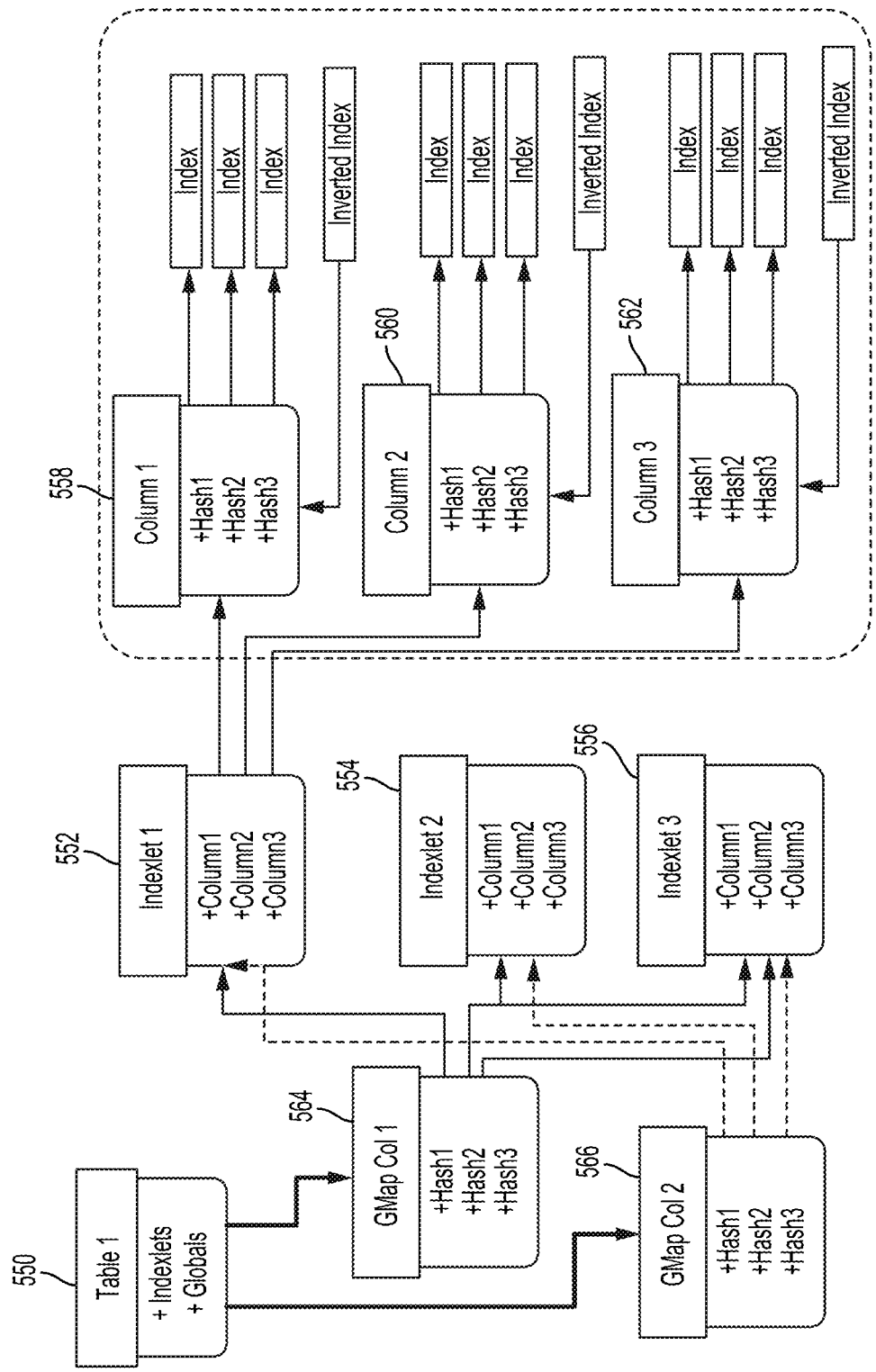
FIG. 5D is a representation of the data structure used for indexlets.

A representation of a data structure for indexlets is shown in FIG. 5D. Rows of a given table 550 can be divided into block bidirectionally indexed by indexlets 552, 554, and 556, respectively. In the example of FIG. 5D, the indexlet 552 can include pointers or references to respective columns 558, 560, and 562 as set forth above with respect to bidirectional table indexes. Each of the indexlets 552, 554, and 556 are logically associated with a bidirectional global attribute lists 564 and 566 that index a particular attribute to the blocks it is present in. Accordingly, an entry in the bidirectional global attribute list 564 and 566 for a given attribute can comprise a reference to an indexlet corresponding to a block having the respective attribute. In an aspect, the reference can include a hash reference. In an aspect, as shown in FIG. 5F, an implicit relationship exists between indexlets in different tables through a common field present in both tables and an attribute-to-attribute (A2A) index.

Thus, the logical inference engine 106 can determine a data subset based on user selections. The logical inference engine 106 automatically maintains associations among every piece of data in the entire dataset used in an application. The logical inference engine 106 can store the binary state of every field and of every data table dependent on user selection (e.g., included or excluded). This can be referred to as a state space and can be updated by the logical inference engine 106 every time a selection is made. There is one bit in the state space for every value in the symbol table or row in the data table, as such the state space is smaller than the data itself and faster to query. The inference engine will work associating values or binary symbols into the dimension tuples. Dimension tuples are normally needed by a hypercube to produce a result.

The associations thus created by the logical inference engine 106 means that when a user makes a selection, the logical inference engine 106 can resolve (quickly) which values are still valid (e.g., possible values) and which values are excluded. The user can continue to make selections, clear selections, and make new selections, and the logical inference engine 106 will continue to present the correct results from the logical inference of those selections. In contrast to a traditional join model database, the associative model provides an interactive associative experience to the user.

FIG. 5C illustrates an example application of BTIs and BAIs to determine inferred states both inter-table and intra-table using Table 1 and Table 2 of FIG. 2. A BTI 520 can be generated for the "Client" attribute of Table 2. In an aspect, the BTI 520 can comprise an inverted index 521. In other aspect, the inverted index 521 can be considered a separate structure. The BTI 520 can comprise a row for each unique attribute in the "Client" column of Table 2. Each unique attribute can be assigned a corresponding position 522 in the BTI 520. In an aspect, the BTI 520 can comprise a hash for each unique attribute. The BTI 520 can comprise a column 523 for each row of Table 2. For each attribute, a "1" can indicate the presence of the attribute in the row and a "0" can indicate an absence of the attribute from the row. "0" and "1" are merely examples of values used to indicate presence or absence. Thus, the BTI 520 reflects that the attribute "Nisse" is found in rows 1 and 6 of Table 2, the attribute "Gullan" is found in row 2 of Table 2, the attribute "Kalle" is found in rows 3 and 4 of Table 2, and the attribute "Pekka" is found in row 5 of Table 2.

The inverted index 521 can be generated such that each position in the inverted index 521 corresponds to a row of Table 2 (e.g., first position corresponds to row 1, second position corresponds to row 2, etc . . . ). A value can be entered into each position that reflects the corresponding position 522 for each attribute. Thus, in the inverted index 521, position 1 comprises the value "1" which is the corresponding position 522 value for the attribute "Nisse", position 2 comprises the value "2" which is the corresponding position 522 value for the attribute "Gullan", position 3 comprises the value "3" which is the corresponding position 522 value for the attribute "Kalle", position 4 comprises the value "3" which is the corresponding position 522 value for the attribute "Kalle", position 5 comprises the value "4" which is the corresponding position 522 value for the attribute "Pekka", and position 6 comprises the value "1" which is the corresponding position 522 value for the attribute "Nisse".

A BTI 524 can be generated for the "Product" attribute of Table 2. In an aspect, the BTI 524 can comprise an inverted index 525. In other aspect, the inverted index 525 can be considered a separate structure. The BTI 524 can comprise a row for each unique attribute in the "Product" column of Table 2. Each unique attribute can be assigned a corresponding position 526 in the BTI 524. In an aspect, the BTI 524 can comprise a hash for each unique attribute. The BTI 524 can comprise a column 527 for each row of Table 2. For each attribute, a "1" can indicate the presence of the attribute in the row and a "0" can indicate an absence of the attribute from the row. "0" and "1" are merely examples of values used to indicate presence or absence. Thus, the BTI 524 reflects that the attribute "Toothpaste" is found in row 1 of Table 2, the attribute "Soap" is found in rows 2, 3, and 5 of Table 2, and the attribute "Shampoo" is found in rows 4 and 6 of Table 2.

By way of example, the inverted index 525 can be generated such that each position in the inverted index 525 corresponds to a row of Table 2 (e.g., first position corresponds to row 1, second position corresponds to row 2, etc.). A value can be entered into each position that reflects the corresponding position 526 for each attribute. Thus, in the inverted index 525, position 1 comprises the value "1" which is the corresponding position 526 value for the attribute "Toothpaste", position 2 comprises the value "2" which is the corresponding position 526 value for the attribute "Soap", position 3 comprises the value "2" which is the corresponding position 526 value for the attribute "Soap", position 4 comprises the value "3" which is the corresponding position 526 value for the attribute "Shampoo", position 5 comprises the value "2" which is the corresponding position 526 value for the attribute "Soap", and position 6 comprises the value "3" which is the corresponding position 526 value for the attribute "Shampoo."

By way of example, a BTI 528 can be generated for the "Product" attribute of Table 1. In an aspect, the BTI 528 can comprise an inverted index 529. In other aspect, the inverted index 529 can be considered a separate structure. The BTI 528 can comprise a row for each unique attribute in the "Product" column of Table 1. Each unique attribute can be assigned a corresponding position 530 in the BTI 528. In an aspect, the BTI 528 can comprise a hash for each unique attribute. The BTI 528 can comprise a column 531 for each row of Table 1. For each attribute, a "1" can indicate the presence of the attribute in the row and a "0" can indicate an absence of the attribute from the row. "0" and "1" are merely examples of values used to indicate presence or absence. Thus, the BTI 528 reflects that the attribute "Soap" is found in row 1 of Table 1, the attribute "Soft Soap" is found in row 2 of Table 1, and the attribute "Toothpaste" is found in rows 3 and 4 of Table 1.

By way of example, the inverted index 529 can be generated such that each position in the inverted index 529 corresponds to a row of Table 1 (e.g., first position corresponds to row 1, second position corresponds to row 2, etc . . . ). A value can be entered into each position that reflects the corresponding position 530 for each attribute. Thus, in the inverted index 529, position 1 comprises the value "1" which is the corresponding position 530 value for the attribute "Soap", position 2 comprises the value "2" which is the corresponding position 530 value for the attribute "Soft Soap", position 3 comprises the value "3" which is the corresponding position 530 value for the attribute "Toothpaste", and position 4 comprises the value "3" which is the corresponding position 530 value for the attribute "Toothpaste".

By way of example, a BAI 532 can be generated as an index between the product attribute of Table 2 and Table 1. The BAI 532 can comprise a row for each unique attribute in the BTI 524 by order of corresponding position 526. The value in each row can comprise the corresponding position 530 of the BTI 528. Thus, position 1 of the BAI 532 corresponds to "Toothpaste" in the BTI 524 (corresponding position 526 of 1) and comprises the value "3" which is the corresponding position 530 for "Toothpaste" of the BTI 528. Position 2 of the BAI 532 corresponds to "Soap" in the BTI 524 (corresponding position 526 of 2) and comprises the value "1" which is the corresponding position 530 for "Soap" of the BTI 528. Position 3 of the BAI 532 corresponds to "Shampoo" in the BTI 524 (corresponding position 526 of 3) and comprises the value "−1" which indicates that the attribute "Shampoo" is not found in Table 1.

By way of example, a BAI 533 can be created to create an index between the product attribute of Table 1 and Table 2. The BAI 533 can comprise a row for each unique attribute in the BTI 528 by order of corresponding position 530. The value in each row can comprise the corresponding position 526 of the BTI 524. Thus, position 1 of the BAI 533 corresponds to "Soap" in the BTI 528 (corresponding position 530 of 1) and comprises the value "2" which is the corresponding position 526 for "Soap" of the BTI 524. Position 2 of the BAI 533 corresponds to "Soft Soap" in the BTI 528 (corresponding position 530 of 2) and comprises the value "−1" which indicates that the attribute "Soft Soap" is not found in Table 2. Position 3 of the BAI 533 corresponds to "Toothpaste" in the BTI 528 (corresponding position 530 of 3) and comprises the value "1" which is the corresponding position 526 for "Toothpaste" of the BTI 524.

FIG. 5C illustrates an example application of the logical inference engine 106 utilizing the BTI 520, the BTI 524, and the BTI 528. A user can select the "Client" "Kalle" from within a user interface. A column for a user selection 534 of "Kalle" can be indicated in the BTI 520 comprising a value for each attribute that reflects the selection status of the attribute. Thus, the user selection 534 comprises a value of "0" for the attribute "Nisse" indicating that "Nisse" is not selected, the user selection 534 comprises a value of "0" for the attribute "Gullan" indicating that "Gullan" is not selected, the user selection 534 comprises a value of "1" for the attribute "Kalle" indicating that "Kalle" is selected, and the user selection 534 comprises a value of "0" for the attribute "Pekka" indicating that "Pekka" is not selected.

The BTI 520 can be consulted to determine that the attribute "Kalle" has a value of "1" in the column 523 corresponding to rows 3 and 4. In an aspect, the inverted index 521 can be consulted to determine that the user selection 534 relates to the position 522 value of "3" which is found in the inverted index 521 at positions 3 and 4, implicating rows 3 and 4 of Table 1. Following path 535, a row state 536 can be generated to reflect the user selection 534 as applied to the rows of Table 2. The row state 536 can comprise a position that corresponds to each row and a value in each position reflecting whether a row was selected. Thus, position 1 of the row state 536 comprises the value "0" indicating that row 1 does not contain "Kalle", position 2 of the row state 536 comprises the value "0" indicating that row 2 does not contain "Kalle", position 3 of the row state 536 comprises the value "1" indicating that row 3 does contain "Kalle", position 4 of the row state 536 comprises the value "1" indicating that row 4 does contain "Kalle", position 5 of the row state 536 comprises the value "0" indicating that row 5 does not contain "Kalle", and position 6 of the row state 536 comprises the value "0" indicating that row 6 does not contain "Kalle".

Following path 537, the row state 536 can be compared with the inverted index 525 to determine the corresponding position 526 contained in the inverted index 525 at positions 3 and 4. The inverted index 525 comprises the corresponding position 526 value of "2" in position 3 and the corresponding position 526 value of "3" in position 4. Following path 538, the corresponding position 526 values of "2" and "3" can be determined to correspond to "Soap" and "Shampoo" respectively in the BTI 524. Thus, the logical inference engine 106 can determine that both "Soap" and "Shampoo" in Table 2 are associated with "Kalle" in Table 2. The association can be reflected in an inferred state 539 in the BTI 524. The inferred state 539 can comprise a column with a row for each attribute in the BTI 524. The column can comprise a value indicated the selection state for each attribute. The inferred state 539 comprises a "0" for "Toothpaste" indicating that "Toothpaste" is not associated with "Kalle", the inferred state 539 comprises a "1" for "Soap" indicating that "Soap" is associated with "Kalle", and inferred state 539 comprises a "1" for "Shampoo" indicating that "Shampoo" is associated with "Kalle".

Following path 540, the inferred state 539 can be compared to the BAI 532 to determine one or more associations between the selection of "Kalle" in Table 2 and one or more attributes in Table 1. As the inferred state 539 comprises a value of "1" in both position 2 and position 3, the BAI 532 can be assessed to determine the values contained in position 2 and position 3 of the BAI 532 (following path 541). Position 2 of the BAI 532 comprises the value "1" which identifies the corresponding position 530 of "Soap" and position 3 of the BAI 532 comprises the value "−1" which indicates that Table 1 does not contain "Shampoo". Thus, the logical inference engine 106 can determine that "Soap" in Table 1 is associated with "Kalle" in Table 2. The association can be reflected in an inferred state 542 in the BTI 528. The inferred state 542 can comprise a column with a row for each attribute in the BTI 528. The column can comprise a value indicated the selection state for each attribute. The inferred state 542 comprises a "1" for "Soap" indicating that "Soap" is associated with "Kalle", the inferred state 542 comprises a "0" for "Soft Soap" indicating that "Soft Soap" is not associated with "Kalle", and the inferred state 542 comprises a "0" for "Toothpaste" indicating that "Toothpaste" is not associated with "Kalle". Based on the current state of BTIs and BAIs, if the data sources 102 indicate that an update or delta change has occurred to the underlying data, the BTIs and BAIs can be updated with corresponding changes to maintain consistency.

In aspects implementing indexlets, the logical inference engine 106 can apply query language by first performing intra-table inferencing on respective tables. Intra-table inferencing comprises transferring the imposed state of one field to other fields within the same table. In an aspect, intra-table inferencing can comprise computing the union of the index of the active attributes in a user input 504. The intersection of the result of the union operation and record states (i.e. row states 510) is then determined. This result is then intersected with the attribute states 514 of other columns using the inverted index 512. If other selection vectors from a previously provided user input vector 504 has zero active entries, a conflict can be detected. In an aspect, the logical inference engine 106 can resolve the detected conflict. In an aspect, resolving a conflict can include deleting or otherwise eliminating one or more incompatible selections. In another aspect, resolving a conflict can include reverting the data model 501 or a portion of the data model 501, e.g. a table, record, or attribute, to a previous state.

Figure 5E:
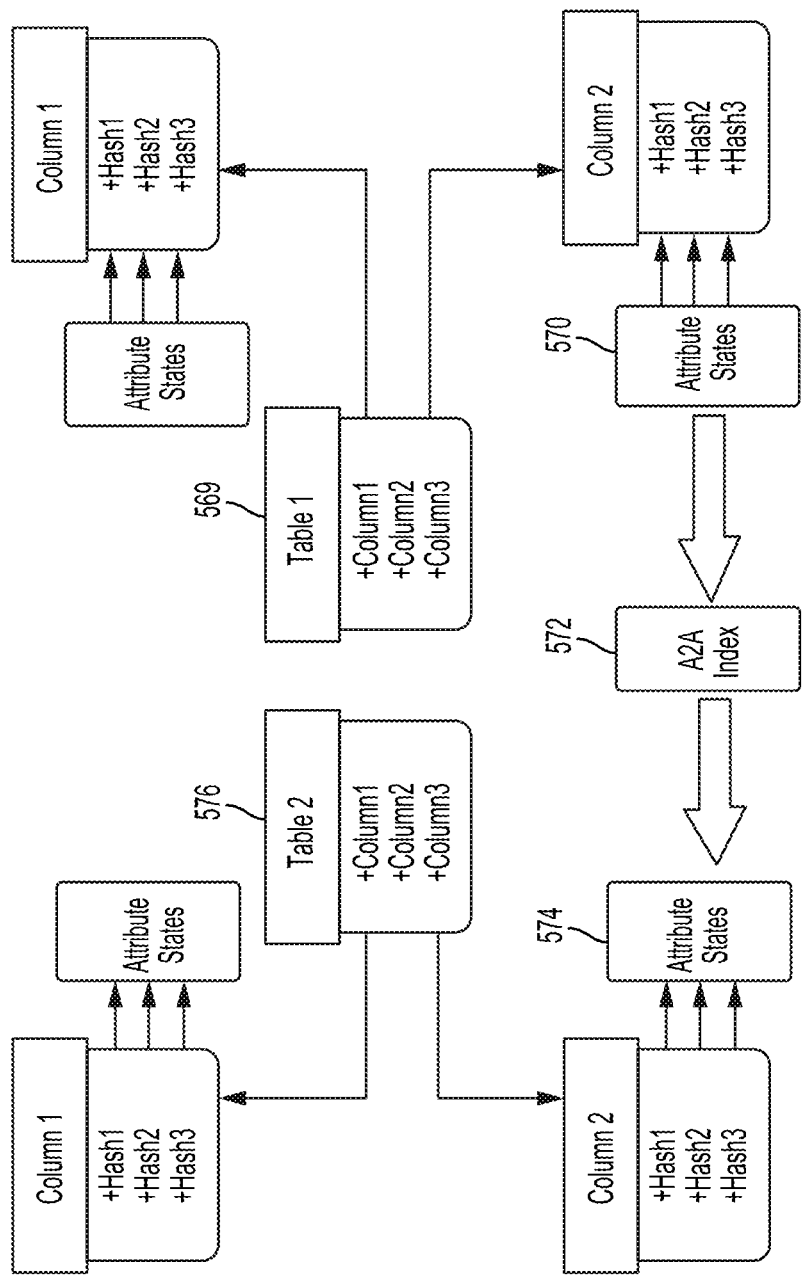
FIG. 5E illustrates an example of inter-table inferencing using indexlets.
Figure 5F:
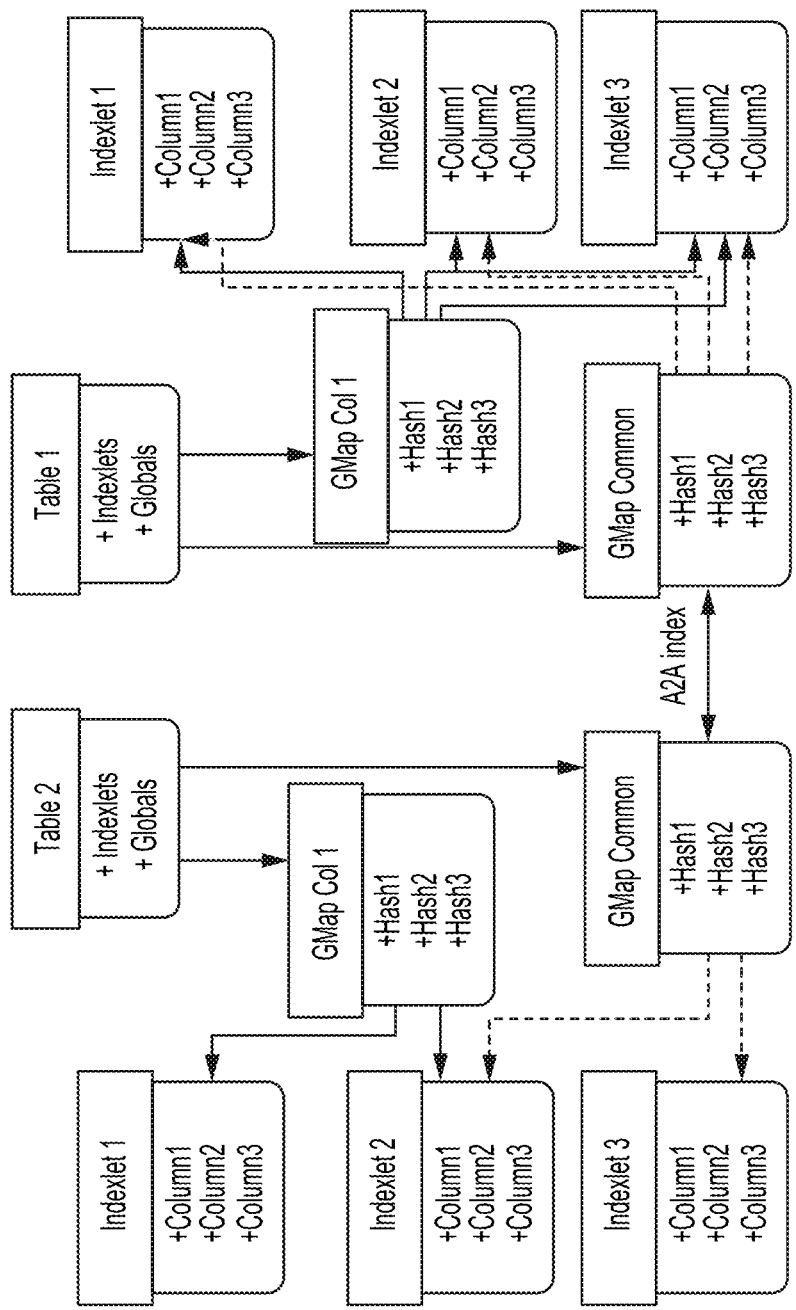
FIG. 5F illustrates an example of linking indexlets of different tables.

In an aspect, after performing intra-table inferencing, the logical inference engine 106 can perform inter-table inferencing based on the intra-table inferencing output of a plurality of tables, as is depicted in FIG. 5E. In an aspect, intra-table inferencing can include transferring a common field attribute of one table 569 to a child in its branch. In an aspect, this can be performed by running the attribute states 570 output from intra-table inferencing through an attribute-to-attribute (A2A) index 572 referencing the attribute states 574 in a second table 576. In an aspect, the A2A index 572 can be partitioned into one or more indexlets as described herein with respect to other data tables. In another aspect, transferring a common field attribute of one table 569 to a child in its branch by running the attribute states 570 output from intra-table inferencing through a function or logic performing similar functionality as the A2A index 572. For example, a function, service, or other logic can accept as input a pair of symbols and return an indication of whether or not they are related, e.g. TRUE or FALSE. In another aspect, attribute-to-attribute relations can be indicated by user input.

Based on current selections and possible rows in data tables a calculation/chart engine 108 can calculate aggregations in objects forming transient hypercubes in an application. The calculation/chart engine 108 can further build a virtual temporary table from which aggregations can be made. The calculation/chart engine 108 can perform a calculation (e.g., evaluate an expression in response to a user selection/de-selection) via a multithreaded operation. The state-space can be queried to gather all of the combinations of dimensions and values necessary to perform the calculation. In an aspect, the query can be on one thread per object, one process, one worker, combinations thereof, and the like. The expression can be calculated on multiple threads per object. Results of the calculation can be passed to a rendering engine 116 and/or optionally to an extension engine 110.

In an aspect, the calculation/chart engine 108 can receive dimensions, expressions, and sorting parameters and can compute a hypercube data structure containing aggregations along the dimensions. For example, a virtual record can be built with a placeholder for all field values (or indices) needed, as a latch memory location. When all values are assigned, the virtual record can be processed to aggregate the fields needed for computations and save the dimension values in a data structure per row of the resulting hypercube. In such a way, the traversal of the database can be done in an arbitrary way, just depending on requirements provided by memory consumption and indexing techniques used for the particular case at hand.

In an aspect, any aggregation function processed by the associative data indexing engine 100 can be qualified to operate on a subset of records (rather than a current selection of data records and/or all data records). The associative data indexing engine 100 can define alternative aggregation sets based on set analysis (e.g., set expression, etc.). Using set analysis, the associative data indexing engine 100 can support methods to define an aggregation set. The exact compositions of defined aggregation sets may not only depend on desired conditions but also the chart (analysis) they are used in. The associative data indexing engine 100 may execute/perform set analysis (e.g., set expression analysis, etc.) for one or more set expressions determined/extracted from a query, such as an undetermined query (e.g., an imprecise query, an undefined query, an incomplete query, a partially expressed query, a portioned query, etc.), to determine and/or define an aggregation set.

To define an aggregation set for an undetermined query (e.g., an imprecise query, an undefined query, an incomplete query, a partially expressed query, a portioned query, etc.), the associative data indexing engine 100 may consider and/or account for items (e.g., compositional elements, predicates, etc.), constraints (e.g., data constraints, logical constraints, etc.) of the query, and one or more data analysis models (e.g., data charts, data tables, data graphs, data maps, graphical objects, key performance indicators (KPIs), etc.).

For example, the associative data indexing engine 100 may determine how each input item and/or computational element fits a data analysis model based on the data analysis model's capacity and/or projectability of an item (e.g., whether it has any condition, whether the condition results on one or multiple values, etc.). For example, the associative data indexing engine 100 may determine an optimal data analysis model from one or more data analysis models determined (e.g., via the calculation/chart engine 108, etc.) from a query (e.g., an undetermined query or another type of query) that best fits each input item and/or computational element.

For example, the associative data indexing engine 100 may define an aggregation set for each of the following undetermined business-related queries:

Query 1: Sales by product where sales >2000
Query 2: Products with sales >2000
Query 3: Number of products with sales >2000

Query 1, Query 2, and Query 3, each include similar (e.g., conceptually similar, etc.) items (e.g., compositional elements, predicates, etc.), such as "sales," "products," ">2000," and/or the like. The associative data indexing engine 100 may, for example, use natural language parsing and/or metadata analysis to determine the items and/or any constraints of the query, such as a default analysis period, a required data/element selection, and/or the like. The computing device may determine/perform a different set analysis for the Query 1, the Query 2, the Query 3, and/or any other undetermined query based on, for example, an order/arrangement of items (and/or computational elements/constraints) of the query and/or the composition (e.g., dimensions, measures, etc.) of one or more data analysis models (e.g., data charts, data tables, data graphs, data maps, graphical objects, key performance indicators (KPIs), etc.). The computing device may determine/perform a different set analysis for Query 1, Query 2, and Query 3 (and/or any other query) according to novel algorithms described herein.

Compositional elements (e.g., predicates, conditions, data constraints, etc.) of a query and/or query data may be determined. Compositional elements (e.g., predicates, conditions, data constraints, etc.) of the query data may include and/or be based on text/items from the query and corresponding conditional predicate(s). For example, for Query 1, Query 2, and Query 3, the associative data indexing engine 100 may determine example compositional elements shown below:

| Predicate | Condition |
|---|---|
| Sales item | >2000 |
| ProductName | N/A (no condition) |

Metadata for and/or associated with a query (e.g., an undetermined query or another type of query) and/or any compositional element for the undetermined query may be determined. For example, semantic data types may uniformly represent standard data types, compositional elements, validations, formatting rules, and other business logic that may be further used to determine and/or define an aggregation set. Semantic types may be stored as metadata structures that may be used and reused during the process of query analysis.

A set of input items and/or computational elements may be adjusted, for example by the associative data indexing engine 100, to ensure there is no conflict. A query, such as a natural question, may include an explicit time frame, for example, an undetermined query may be "Sales by product, where sales>2000 in 2019," where the year 2019 is the explicit time frame for the query. The associative data indexing engine 100 may determine that any default time period is unwarranted and/or if the global selections already satisfy any metadata-driven preconditions to use a measure.

The best data analysis model for a query may be determined. For example, the best data analysis model may be a data analysis model most relevant to a query—determined based on how aggregated related data may potentially fit and/or apply to elements, fields, constraints, components, and/or the like of a data analysis model. For example, input items and/or computational elements associated with a rank and/or ranking may be best fitted to a bar chart and/or related data analysis model, input items and/or computational elements associated with values may be best fitted to a table, input items and/or computational elements associated with facts may be best fitted to a KPI and/or related data analysis model.

The associative data indexing engine 100 may determine, for example, a data analysis model most relevant to a query based on the analysis' capacity and also the projectability of an item and/or compositional element and of a query, such as whether the item and/or compositional element is associated with any condition, and/or whether the condition results on one or multiple values. For example, the associative data indexing engine 100 may determine that a rank analysis may accommodate one measure and one dimension. For example, a rank analysis and/or associated data analysis model may be determined for Query 1 (Sales by product where sales >2000) because a rank analysis and/or associated data analysis model may include "sales and measure," and "product" as dimensions. However, for a slightly modified query such as:

Modified Query 1: Sales by product in Nordic countries where Sales>2000;

there are two dimensions, "product" and "country," to choose from, and "product" has no condition which gives it an edge over "country." In such a situation, the associative data indexing engine 100 may combine items, compositional elements, and/or constraints and determine/generate set expressions. A final set of compositional elements and/or constraints may be combined, for example by the query analysis module 105, for further analysis, for example, by the calculation/chart engine 108.

Figure 3:
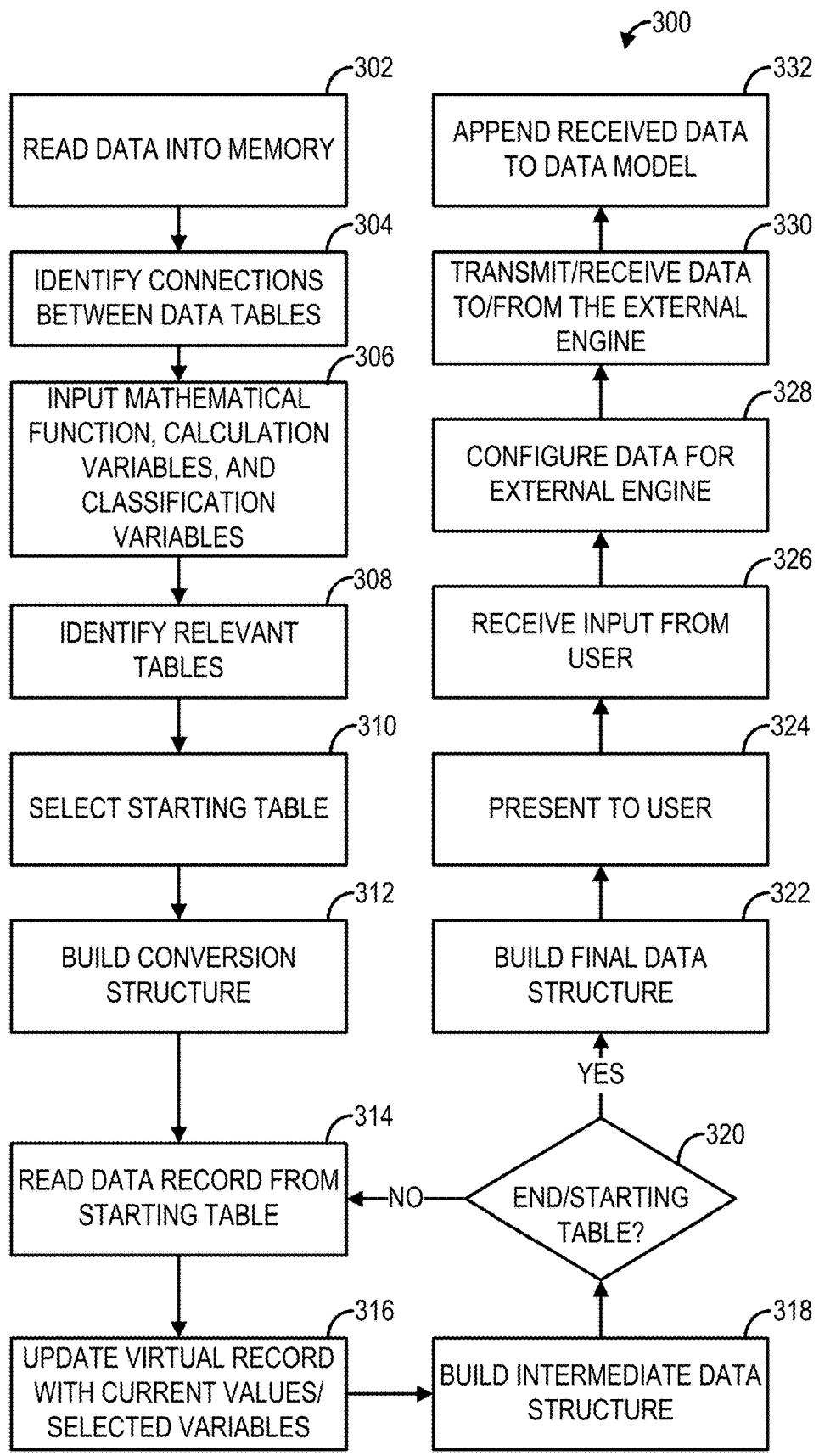
FIG. 3 is a schematic flowchart showing basic operations performed when extracting information from a database.

The methods provided can be implemented by means of a computer program as illustrated in a flowchart of a method 300 in FIG. 3 and/or other methods described herein. In a operation 302, the program can read some or all data records in the database, for instance using a SELECT statement which selects all the tables of the database, e.g. Tables 1-5. In an aspect, the database can be read into primary memory of a computer.

To increase evaluation speed, each unique value of each data variable in said database can be assigned a different binary code and the data records can be stored in binary-coded form. This can be performed, for example, when the program first reads the data records from the database. For each input table, the following operations can be carried out. The column names, e.g. the variables, of the table can be read (e.g., successively). Every time a new data variable appears, a data structure can be instantiated for the new data variable. An internal table structure can be instantiated to contain some or all the data records in binary form, whereupon the data records can be read (e.g., successively) and binary-coded. For each data value, the data structure of the corresponding data variable can be checked to establish if the value has previously been assigned a binary code. If so, that binary code can be inserted in the proper place in the above-mentioned table structure. If not, the data value can be added to the data structure and assigned a new binary code, for example the next binary code in ascending order, before being inserted in the table structure. In other words, for each data variable, a unique binary code can be assigned to each unique data value.

After having read some or all data records in the database, the method 300 can analyze the database in a operation 304 to identify all connections between the data tables. A connection between two data tables means that these data tables have one variable in common. In an aspect, operation 304 can comprise generation of one or more bidirectional table indexes and one or more bidirectional associative indexes. In an aspect, generation of one or more bidirectional table indexes and one or more bidirectional associative indexes can comprise a separate operation. In another aspect, generation of one or more bidirectional table indexes and one or more bidirectional associative indexes can be on-demand. After the analysis, all data tables are virtually connected. In FIG. 2, such virtual connections are illustrated by double-ended arrows. The virtually connected data tables can form at least one so-called "snowflake structure," a branching data structure in which there is one and only one connecting path between any two data tables in the database. Thus, a snowflake structure does not contain any loops. If loops do occur among the virtually connected data tables, e.g. if two tables have more than one variable in common, a snowflake structure can in some cases still be formed by means of special algorithms known in the art for resolving such loops.

After this initial analysis, the user can explore the database and/or define a mathematical function. Assume that the user wants to extract the total sales per year and client from the database in FIG. 2. The user defines a corresponding mathematical function "SUM (x*y)", and selects the calculation variables to be included in this function: "Price" and "Number." The user also selects the classification variables: "Client" and "Year."

Optionally, a mathematical function may be determined for an undetermined query (e.g., an imprecise query, an undefined query, an incomplete query, a partially expressed query, a portioned query, etc.), for example, "Sales by product where sales >2000." Calculation variables for the undetermined query may include "Product," "Price," "Date," and "Year."

At operation 306, a mathematical function may be determined. The mathematical function may be, for example, a combination of mathematical expressions. For example, an undetermined query such as "Sales by product where sales >2000," can be used to extract the total sales of a product where the number (e.g., sale amount, etc.) exceeds 2000. A corresponding mathematical function may be defined, for example by a user as:

=sum({<Set1, Set2>} Sales),
where:
Set1=[Product]={'=Sum({<[QuartersAgo]={0}>} Sales >2000)'}; and
Set2=[QuartersAgo]={0}.

Calculation variables to be included in this function may include "Product" and "Number." The classification variable "Year" may also be set, for example, by a user.

The method 300 then identifies in operation 308 all relevant data tables, e.g. all data tables containing any one of the selected calculation and classification variables, such data tables being denoted boundary tables, as well as intermediate data tables in the connecting path(s) between these boundary tables in the snowflake structure, such data tables being denoted connecting tables. There are no connecting tables in the present example. In an aspect, one or more bidirectional table indexes and one or more bidirectional associative indexes can be accessed as part of operation 308.

In the present example, all occurrences of every value, e.g. frequency data, of the selected calculation variables can be included for evaluation of the mathematical function. In FIG. 2, the selected variables ("Price," "Number") can require such frequency data. Now, a subset (B) can be defined that includes all boundary tables (Tables 1-2) containing such calculation variables and any connecting tables between such boundary tables in the snowflake structure. It should be noted that the frequency requirement of a particular variable is determined by the mathematical expression in which it is included. Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table can be selected in operation 310, for example, among the data tables within subset (B). In an aspect, the starting table can be the data table with the largest number of data records in this subset. In FIG. 2, Table 2 can be selected as the starting table. Thus, the starting table contains selected variables ("Client," "Number"), and connecting variables ("Date," "Product"). These connecting variables link the starting table (Table 2) to the boundary tables (Tables 1 and 3).

Thereafter, a conversion structure can be built in operation 312. This conversion structure can be used for translating each value of each connecting variable ("Date," "Product") in the starting table (Table 2) into a value of a corresponding selected variable ("Year," "Price") in the boundary tables (Table 3 and 1, respectively). A table of the conversion structure can be built by successively reading data records of Table 3 and creating a link between each unique value of the connecting variable ("Date") and a corresponding value of the selected variable ("Year"). It can be noted that there is no link from value 4 ("Date: 1999-01-12"), since this value is not included in the boundary table. Similarly, a further table of the conversion structure can be built by successively reading data records of Table 1 and creating a link between each unique value of the connecting variable ("Product") and a corresponding value of the selected variable ("Price"). In this example, value 2 ("Product: Toothpaste") is linked to two values of the selected variable ("Price: 6.5"), since this connection occurs twice in the boundary table. Thus, frequency data can be included in the conversion structure. Also note that there is no link from value 3 ("Product: Shampoo").

When the conversion structure has been built, a virtual data record can be created. Such a virtual data record accommodates all selected variables ("Client," "Year," "Price," "Number") in the database. In building the virtual data record, a data record is read in operation 314 from the starting table (Table 2). Then, the value of each selected variable ("Client", "Number") in the current data record of the starting table can be incorporated in the virtual data record in a operation 316. Also, by using the conversion structure each value of each connecting variable ("Date", "Product") in the current data record of the starting table can be converted into a value of a corresponding selected variable ("Year", "Price"), this value also being incorporated in the virtual data record.

In operation 318 the virtual data record can be used to build an intermediate data structure. Each data record of the intermediate data structure can accommodate each selected classification variable (dimension) and an aggregation field for each mathematical expression implied by the mathematical function. The intermediate data structure can be built based on the values of the selected variables in the virtual data record. Thus, each mathematical expression can be evaluated based on one or more values of one or more relevant calculation variables in the virtual data record, and the result can be aggregated in the appropriate aggregation field based on the combination of current values of the classification variables ("Client," "Year").

The above procedure can be repeated for one or more additional (e.g., all) data records of the starting table. In a operation 320 it can be checked whether the end of the starting table has been reached. If not, the process can be repeated from operation 314 and further data records can be read from the starting table. Thus, an intermediate data structure can be built by successively reading data records of the starting table, by incorporating the current values of the selected variables in a virtual data record, and by evaluating each mathematical expression based on the content of the virtual data record. If the current combination of values of classification variables in the virtual data record is new, a new data record can be created in the intermediate data structure to hold the result of the evaluation. Otherwise, the appropriate data record is rapidly found, and the result of the evaluation is aggregated in the aggregation field.

Thus, data records can be added to the intermediate data structure as the starting table is traversed. The intermediate data structure can be a data table associated with an efficient index system, such as an AVL or a hash structure. The aggregation field can be implemented as a summation register, in which the result of the evaluated mathematical expression is accumulated.

In some aspects, e.g. when evaluating a median, the aggregation field can be implemented to hold all individual results for a unique combination of values of the specified classification variables. It should be noted that only one virtual data record is needed in the procedure of building the intermediate data structure from the starting table. Thus, the content of the virtual data record can be updated for each data record of the starting table. This can minimize the memory requirement in executing the computer program.

After traversing the starting table, the intermediate data structure can contain a plurality of data records. If the intermediate data structure accommodates more than two classification variables, the intermediate data structure can, for each eliminated classification variable, contain the evaluated results aggregated over all values of this classification variable for each unique combination of values of remaining classification variables.

In an aspect, operation 322 can involve any of the processes described previously with regard to FIG. 5A-5F as part of a process for creating the hypercube/multidimensional cube. For example, output from the logical inference engine 18 and/or 106 utilizing one or more BTIs and or one or more A2A indexes can be used in creation of the hypercube/multidimensional cube. When a user makes a selection, the inference engine 18 and/or 106 calculates a data subset of which one or more BTIs and/or A2A indexes can be generated and provided to the chart engine 58 and/or calculation/chart 108 for use in generating a hypercube/multidimensional cube and/or evaluating one or more expressions against a hypercube/multidimensional cube via one or more BTIs and/or A2A indexes as described with regard to FIG. 5A-5F.

In an aspect, when the intermediate data structure has been built, a final data structure(s), e.g., data analysis model(s) (e.g., data charts, data tables, data graphs, data maps, key performance indicators (KPIs), etc.), may be created by evaluating the mathematical function based on the results of the mathematical expression contained in the intermediate data structure. In doing so, the results in the aggregation fields for each unique combination of values of the classification variables may be combined.

The data analysis model may be a best fit data analysis model, for example, a data analysis model that best fits compositional elements (e.g., predicates, conditions, data constraints, etc.) of an undetermined query and/or any other query. As explained, a data analysis model most relevant to a query may be based on the analysis' capacity and also the projectability of an item and/or compositional element and of the query, such as whether the item and/or compositional element is associated with any condition, and/or whether the condition results on one or multiple values.

In the example, the creation of the final data structure is straightforward, due to the trivial nature of the present mathematical function. At operation 324, the content of the final data structure may be presented to the user.

At operation 326, input from the user can be received. For example, input from the user can be a selection and/or de-selection of the presented results.

Optionally, input from the user at operation 326 can comprise a request for external processing. In an aspect, the user can be presented with an option to select one or more external engines to use for the external processing. Optionally, at operation 328, data underlying the user selection can be configured (e.g., formatted) for use by an external engine.

Optionally, at operation 330, the data can be transmitted to the external engine for processing and the processed data can be received. The received data can undergo one or more checks to confirm that the received data is in a form that can be appended to the data model. For example, one or more of an integrity check, a format check, a cardinality check, combinations thereof, and the like. Optionally, at operation 332, processed data can be received from the external engine and can be appended to the data model as described herein. In an aspect, the received data can have a lifespan that controls how long the received data persists with the data model. For example, the received data can be incorporated into the data model in a manner that enables a user to retrieve the received data at another time/session. In another example, the received data can persist only for the current session, making the received data unavailable in a future session.

FIG. 5A shows how an undetermined query 50 (e.g., an imprecise query, an undefined query, an incomplete query, a partially expressed query, a portioned query, etc.) operates and/or is executed on a data/information 52 to generate a data subset 54. The data subset 54 can form a state space, which is based on the undetermined query 50. In an aspect, the state space (or "user state") may be defined by a user providing query information via a user interface of an application. For example, the state space may be based on any of the following undetermined business-related queries:

Query 1: Sales by product where sales >2000
Query 2: Products with sales >2000
Query 3: Number of products with sales >2000

Query 1, Query 2, and Query 3, each include similar (e.g., conceptually similar, etc.) items (e.g., compositional elements, predicates, etc.), such as "sales," "products," ">2000," and/or the like. Natural language parsing and/or metadata analysis may be used to determine the items and/or any constraints of the query, such as a default analysis period, a required data/element selection, and/or the like. A different set analysis may be performed for Query 1, Query 2, Query 3, and/or any other undetermined query based on, for example, an order/arrangement of items (and/or constraints) of the query and/or the composition (e.g., dimensions, measures, etc.) of one or more data analysis models (e.g., data charts, data tables, data graphs, data maps, graphical objects, key performance indicators (KPIs), etc.).

One or more items and/or data constraints of a query (e.g., an undetermined query or another type of query) may be used to determine one or more data analysis models. An application can be designed to host a number of data analysis models (e.g., data charts, data tables, data graphs, data maps, graphical objects, key performance indicators (KPIs), etc.) that evaluate one or more mathematical functions (also referred to as an "expression") on the data subset 54 for one or more dimensions (classification variables). The result of this evaluation creates a data analysis model result 56.

As illustrated in FIG. 5A, when a user selection, such as an undetermined query 50, is received, the inference engine 18 calculates a data subset. Also, an identifier ID1 for the selection together with the scope can be generated based on the filters in the selection and the scope. Subsequently, an identifier ID2 for the data subset is generated based on the data subset definition, for example, a bit sequence that defines the content of the data subset. ID2 can be put into a cache using ID1 as a lookup identifier. Likewise, the data subset definition can be put in the cache using ID2 as a lookup identifier.

As shown in FIG. 5A, a chart (and/or any other data analysis model) calculation in a calculation/chart engine 58 takes place in a similar way. Here, there are two information sets: the data subset 54 and relevant chart (and/or any other data analysis model) properties 60. The latter can be, but not restricted to, a mathematical function together with calculation variables and classification variables (dimensions).

Mathematical functions together with calculation variables and classification variables (dimensions) can be used to calculate the chart result 56, and both of these information sets can be also used to generate identifier ID3 for the input to the chart calculation. ID2 can be generated already in the previous operation, and ID3 can be generated as the first operation in the chart calculation procedure.

The identifier ID3 can be formed from ID2 and the relevant chart properties. ID3 can be seen as an identifier for a specific chart generation instance, which can include all information needed to calculate a specific chart result. In addition, a chart result identifier ID4 can be created from the chart result definition, for example, a bit sequence that defines the chart result 56. ID4 can be put in the cache using ID3 as a lookup identifier. Likewise, the chart result definition can be put in the cache using ID4 as a lookup identifier.

Optionally, further calculations, transforming, and/or processing can be included through an extension engine 62. Optionally, associated results from the inference engine 18 and further computed by hypercube computation in said calculation/chart engine 58 can be coupled to an external engine 64 that can comprise one or more data processing applications (e.g., simulation applications, statistical applications, mathematical computation applications, database applications, combinations thereof, and the like). Context of a data model processed by the inference engine 18 can comprise a tuple or tuples of values defined by dimensions and expressions computed by hypercube routines. Data can be exchanged through an interface 66.

The associated results coupled to the external engine 64 can be intermediate. Further results that can be final hypercube results can also be received from the external engine 64. Further results can be fed back to be included in the Data/Scope 52 and enrich the data model. The further results can also be rendered directly to the user in the chart result 56. Data received from and computed by the external engine 64 can be used for further associative discovery.

Each of the data elements of the database shown in Tables 1-5 of FIG. 2 has a data element type and a data element value (for example "Client" is the data element type and "Nisse" is the data element value). Multiple records can be stored in different database structures such as data cubes, data arrays, data strings, flat files, lists, vectors, and the like; and the number of database structures can be greater than or equal to one and can comprise multiple types and combinations of database structures. While these and other database structures can be used with, and as part of, the methods and systems disclosed, the remaining description will refer to tables, vectors, strings, and data cubes solely for convenience.

Additional database structures can be included within the database illustrated as an example herein, with such structures including additional information pertinent to the database such as, in the case of products for example; color, optional packages, etc. Each table can comprise a header row which can identify the various data element types, often referred to as the dimensions or the fields, that are included within the table. Each table can also have one or more additional rows which comprise the various records making up the table. Each of the rows can contain data element values (including null) for the various data element types comprising the record.

The database as referred to in Tables 1-5 of FIG. 2 can be queried by specifying the data element types and data element values of interest and by further specifying any functions to apply to the data contained within the specified data element types of the database. The functions which can be used within a query can include, for example, expressions using statistics, sub-queries, filters, mathematical formulas, and the like, to help the user to locate and/or calculate the specific information wanted from the database. Once located and/or calculated, the results of a query can be displayed to the user with various visualization techniques and objects such as list boxes of a user interface illustrated in FIG. 6.

The graphical objects (or visual representations) can be substantially any display or output type including graphs, charts, trees, multi-dimensional depictions, images (computer-generated or digital captures), video/audio displays describing the data, hybrid presentations where output is segmented into multiple display areas having different data analysis in each area and so forth. A user can select one or more default visual representations; however, a subsequent visual representation can be generated on the basis of further analysis and subsequent dynamic selection of the most suitable form for the data.

In an aspect, a user can select a data point and a visualization component can instantaneously filter and re-aggregate other fields and corresponding visual representations based on the user's selection. In an aspect, the filtering and re-aggregation can be completed without querying a database. In an aspect, a visual representation can be presented to a user with color schemes applied meaningfully. For example, a user selection can be highlighted in green, datasets related to the selection can be highlighted in white, and unrelated data can be highlighted in gray. A meaningful application of a color scheme provides an intuitive navigation interface in the state space.

Figure 6:
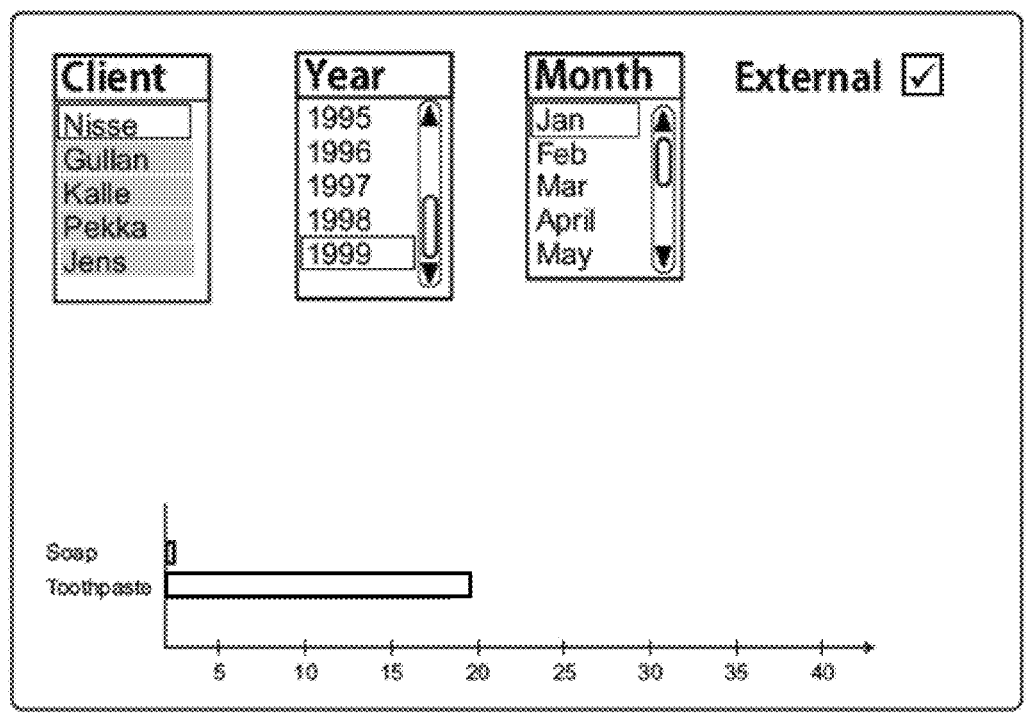
FIG. 6 is a schematic graphical presentation showing selections and a diagram of data associated to the selections as received after processing by an external engine.

The result of a standard query can be a smaller subset of the data within the database, or a result set, which is comprised of the records, and more specifically, the data element types and data element values within those records, along with any calculated functions, that match the specified query. For example, as indicated in FIG. 6, the data element value "Nisse" can be specified as a query or filtering criteria as indicated by a frame in the "Client" header row. In some aspects, the selected element can be highlighted in green. By specifically selecting "Nisse," other data element values in this row are excluded as shown by gray areas. Further, "Year" "1999" and "Month" "Jan" are selected in a similar way.

Figure 7:
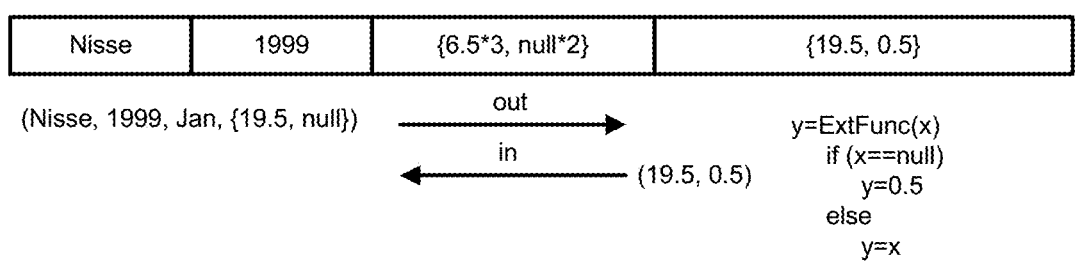
FIG. 7 is a schematic representation of data exchanged with an external engine based on selections in FIG. 6.

Optionally, in this application, external processing can also be requested by ticking "External" in the user interface of FIG. 6. Data as shown in FIG. 7 can be exchanged with an External engine 64 through the interface 66 of FIG. 5A. In addition to evaluating the mathematical function ("SUM (Price*Number)") based on the results of the mathematical expression ("Price*Number") contained in the intermediate data structure the mathematical function ("SUM (ExtFunc (Price*Number))") can be evaluated. Data sent out are (Nisse, 1999, January, {19.5, null}). In this case the external engine 64 can process data in accordance with the formula

```
if (x==null)
    y=0.5
```

```
else
    y=x
``` as shown in in FIG. 7. The result input through the interface 66 will be (19.5, 0.5) as reflected in the graphical presentation in FIG. 6.

In a further aspect, external processing can also be optionally requested by ticking "External" in a box as shown in FIG. 8. Data as shown in FIG. 9 can be exchanged with an external engine 64 through the Interface 66 of FIG. 5A. In addition to evaluating the mathematical function ("SUM (Price*Number)") based on the results of the mathematical expression ("Price*Number") contained in the intermediate data structure the mathematical function:

SUM(ExtFunc(Price*Number))

can be evaluated. Data sent out are (Nisse, 1999, Jan, {19.5, null}). In this case, the external engine 64 will process data in accordance with Function (1) as shown below and in FIG. 9. The result input through the Interface 66 will be (61.5) as reflected in the graphical presentation in FIG. 8.

```
y=ExtAggr(x[ ])
for (x in x[ ])
    if (x==null)
        y=y + 42
    else
        y=y+x
```

Function (1)

Figure 13:
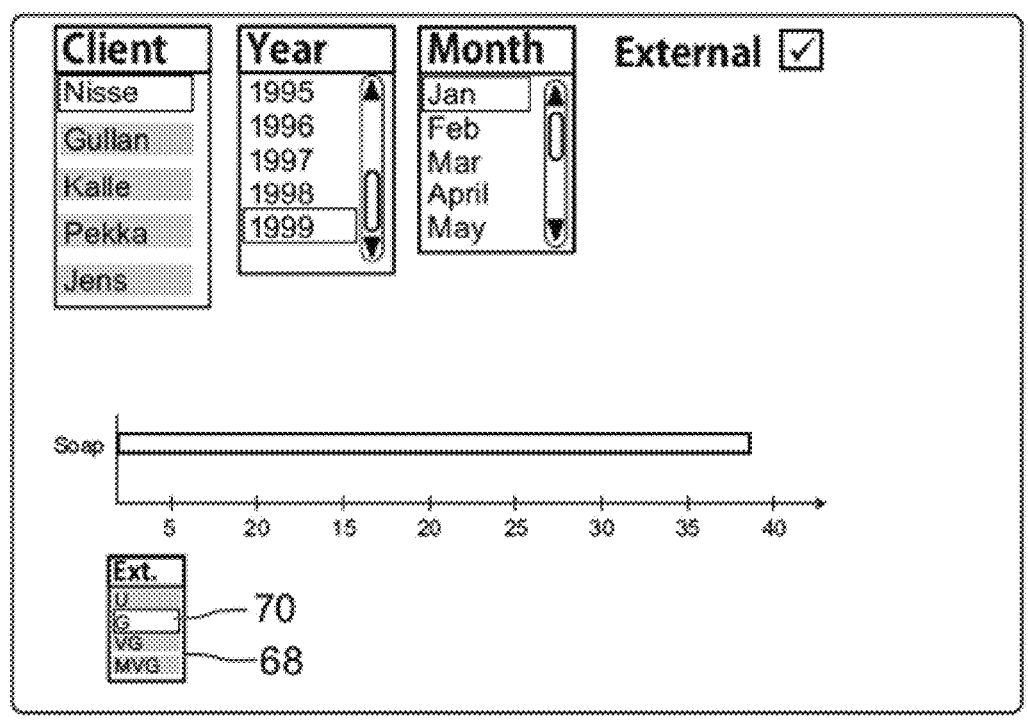
FIG. 13 is a schematic graphical presentation showing a further set of selections and a diagram of data associated to the selections as received after third computations from an external engine.

A further optional embodiment is shown in FIG. 10 and FIG. 11. The same basic data as in previous examples apply. A user selects "Pekka," "1999," "Jan," and "External." By selecting "External," already determined and associated results are coupled to the external engine 64. Feedback data from the external engine 64 based on an external computation, ExtQualification(Sum(Price*Number)), as shown in FIG. 13 will be the information "MVG." This information can be fed back to the logical inference engine 18. The information can also be fed back to the graphical objects of FIG. 10 and as a result a qualification table 68 will highlight "MVG" (illustrated with a frame in FIG. 10). Other values (U, G, and VG) are shown in gray areas. The result input through the Interface 66 will be Soap with a value of 75 as reflected in the graphical presentation (bar chart) of FIG. 10. FIG. 11 is a schematic representation of data exchanged with an external engine based on selections in FIG. 10. FIG. 12 is a table showing results from computations based on different selections in the presentation of FIG. 10.

Should a user instead select "Gullan," "1999," "Jan," and "External," the feedback signal would include "VG" based on the content shown in qualification table 68. The computations actually performed in the external engine 62 are not shown or indicated, since they are not relevant to the inference engine.

In FIG. 13 a user has selected "G" as depicted by 70 in the qualification table 68. As a result information fed back from the external engine 64 to the external engine 62 and further to the inference engine 18 the following information will be highlighted: "Nisse," "1999," and "Jan" as shown in FIG. 13. Furthermore, the result produced will be Soap 37.5 as reflected in the graphical presentation (bar chart) of FIG. 13.

A result of the various embodiments disclosed herein is a business analytic solution. The business analytic solution operates on the data stored and/or generated (e.g., hypercube/multidimensional cube, various indexes, etc . . . ) by the disclosed embodiments. Users of the business analytic solution can query the data to obtain insight into the data. The query can be made, for example, by specifying data element types and data element values of interest and by further specifying any functions to apply to the data contained within the specified data element types of the database. The functions which can be used within a query can include, for example, expressions using statistics, sub-queries, filters, mathematical formulas, and the like, to help a user to locate and/or calculate the specific information wanted from the database. Once located and/or calculated, the results of a query can be displayed to the user with various visualization techniques and objects such as list boxes or various charts of a user interface. In another aspect, a result of the query can be displayed not only as visualizations but in the form of natural language, providing the user an insight overview across data sources and/or data tables.

Provided herein, among other things, is a "smart" DSS and related analytic techniques. The DSS and related techniques form a business analytic solution. For example, the business analytic solution can make reasonable defaults at various operations of an analysis, from data preparation, to building the data model, and preparing visual and/or text analyses. In an aspect, the business analytic solution can guide users to make sensible choices in order to quickly get to both expected answers and new answers (e.g., new insights). The business analytic solution enables a user to find unknown insights from the data and presents it to the user with the use of the systems and methods disclosed herein.

Domain experts, such as data architects, or visualization experts, are sources to provide rules (e.g., defaults and guidelines, usually in the form of generic best practices) for data analysis. Similarly, specific precedents that are established by users or a community of users who actually use the data are also sources of rules (e.g., defaults and guidelines) for data analysis. The disclosed embodiments, individually or in particular combinations, can provide an optimized technique to capture and represent such rules. Given the heuristic nature of such rules, the disclosed embodiments can utilize precedents to capture both types of rules (e.g., domain expert rules and user rules). Such precedents can then be utilized in a system that, given a specific context, can locate applicable precedents (for example, by similarity and/or generalization) and use those precedents to enable smart data analysis behavior.

Figure 14:
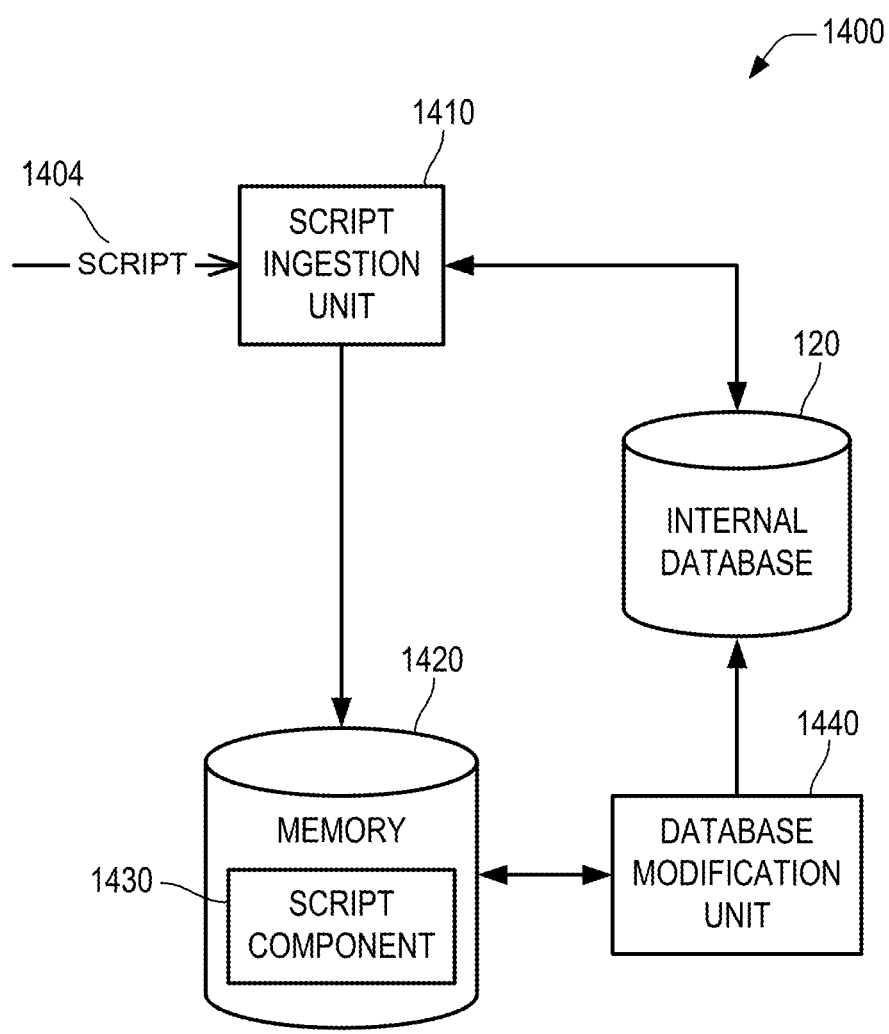
FIG. 14 is a schematic block diagram of an example system for database modification using a script component.

FIG. 14 is a schematic block diagram of an example system 1400 for database modification using a script component, in accordance with one or more embodiments of this disclosure. The example system 1400 can constitute the script engine 104 (FIG. 1) in some embodiments. The example system 1400 comprises a script ingestion unit 1410 that can receive a script 1404. Receiving the script 1404 can include receiving data defining the script 1404. The script 1404 can include one or more functions to transform a database. A first function of the one or more functions can comprise a LOAD statement, a JOIN statement, or a CONCATENATE statement, for example. Indeed, the script 1404 can support at least one set (e.g., one set, some sets, or all sets) of native functions implemented in the script engine 104 (FIG. 1). In this disclosure, the term support refers to access to built or otherwise compiled program code during execution, where the program code defines a particular functions. Thus, when the script 1404 supports a particular function, execution of the script 1404 can result in the implementation of one or more operations corresponding to the particular function.

Figure 15A:
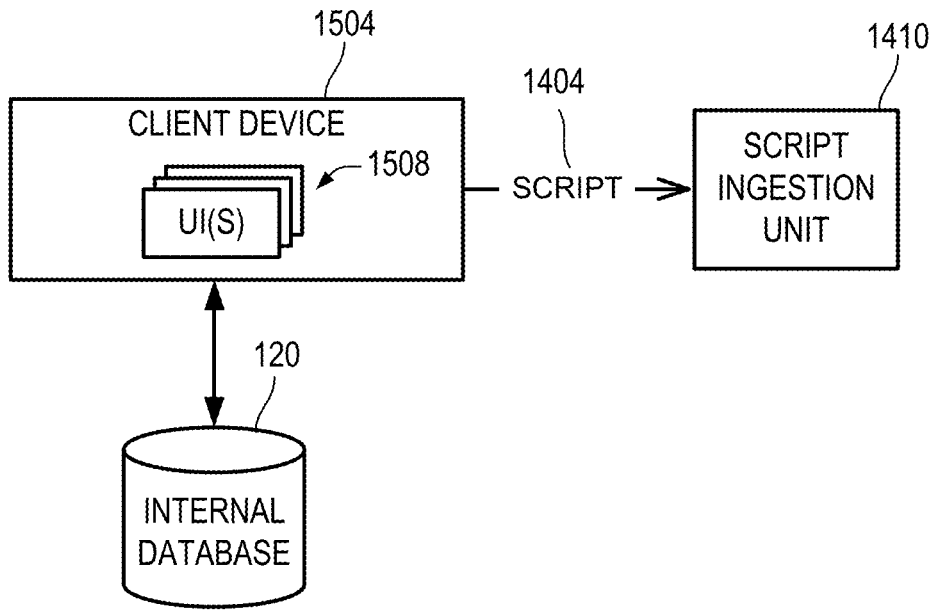
FIG. 15A illustrates an example of a client device for database modification using a script component.

In some embodiments, as is shown in FIG. 15A, a client device 1504 can supply such data. To that end, the client device 1504 can include, or can be coupled to, a display device that can present one or more user interfaces 1508 that, individually or in combination, can permit inputting the data.

In one embodiment, the client device can present a user interface including selectable visual element(s) or a non-selectable visual element(s) that, individually or in combination, can be used to select elements of the internal database 120 to define a database to be modified. The elements that are selected constitute input data for one or more transformations to be applied to the database defined by those elements. The elements of the database 120 that are selected can include one or more dimensions and/or one or more measures. Such dimension(s) and measure(s), individually or in a particular combination, can define a hypercube. That hypercube can embody the database to be modified, and can be a visible hypercube or a hidden hypercube.

Figure 15B:
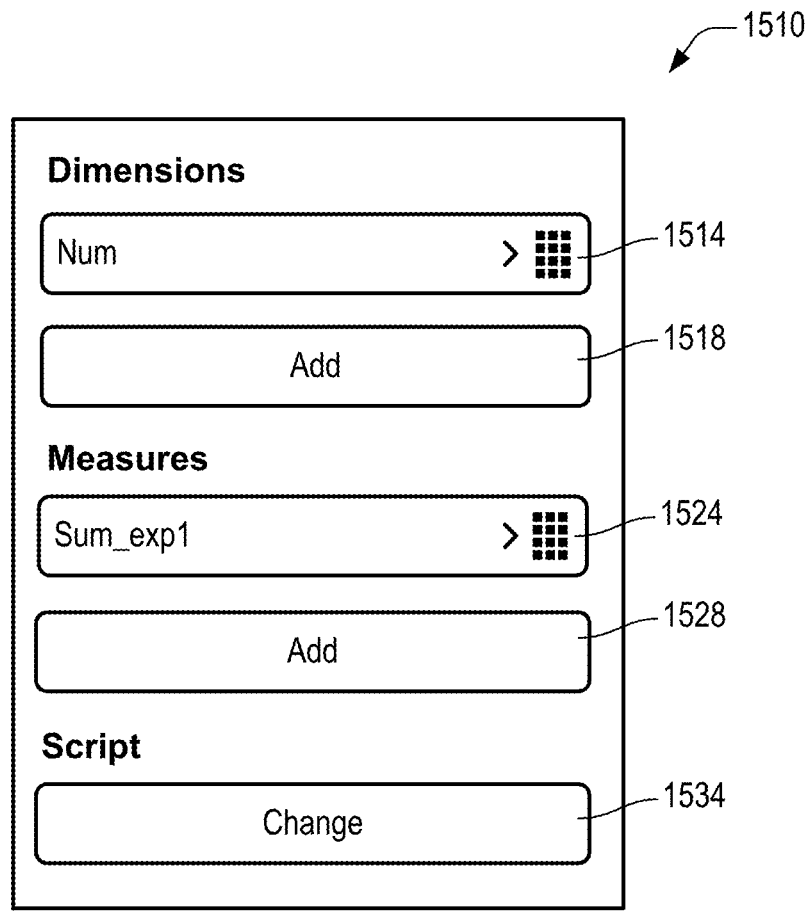
FIG. 15B illustrates an example of a user interface for database modification using a script component.

Simply as an illustration, FIG. 15B presents an example of user interface 1510 that can be used to define the database (e.g., the hypercube) to be modified and to provide the script 1404. The user interface 1510 can include a first selectable visual element 1514 and a second selectable visual element 1518. Those selectable visual elements can permit selecting a dimension and a measure to define the database. More specifically, selection of the first selectable visual element 1514 can cause the client device 1504 to present another user interface (not depicted) that identifies one or several dimensions that are available for selection. To that end, the client device 1504 can be functionally coupled to the internal database 120. The identified dimensions are included in the internal database 120. The user interface 1510 also can include a third selectable visual element 1518 that, in response to being selected, causes the selected dimension(s) to be added to the script 1404.

Further, selection of the second selectable visual element 1524 can cause the client device 1504 to present another user interface (not depicted) that identifies one or several measures that are available for selection. As mentioned, to that end, the client device 1504 can be functionally coupled to the internal database 120. The identified measures are included in the internal database 120. The user interface 1510 also can include a fourth selectable visual element 1528 that, in response to being selected, causes the selected measures(s) to be added to the script 1404.

The user interface 1510 also can include a fifth selectable visual element 1534. Selection of the fifth selectable visual element 1534 can cause the client device 1504 to present a script editor interface (not depicted) that can be used to input the script 1404. In some cases, the script editor interface can present an extant script that can be modified to create the script 1404. To that end, the internal database 120 can include an object property representing scripts, such as a "script" object property on same level as dimensions and measures. When the script editor interface is opened, a single table defined by the dimension(s) and measure(s) previously selected. That table constitute a hypercube that can modified using the script 1404. Simply for the sake of nomenclature, such a hypercube can be referred to as "PrimaryCube." That hypercube also can be labeled in other ways.

In some embodiments, instead of presenting a user interface with various graphical UI elements, the client device 1504 can present a command-line prompt that permits defining the database (e.g., hypercube) to be modified and a script. Scripts that can be provided by the command-line prompt might be more straightforward than the scripts that can be provided by means of a script editor interface.

With further reference to FIG. 14, the script ingestion unit 1410 can retain the script 1404 as a script component 1430 within one or more memory devices 1420 (referred to memory 1420). The example system 1400 also can include a database modification unit 1450 that can execute the script component 1430. In some embodiments, the database modification unit 1440 can include hardware that can execute the script component 1440. The hardware can be embodied in a processor or similar data processing device, for example.

In response to execution of the script component 1430, the database modification unit 1440 can access the table defining the hypercube to be modified (the PrimaryCube) from the internal database 120. In further response to execution of the script component 1430, the database modification unit 1440 can modify the hypercube based on at least one transformation defined by the function(s) in the script 1404.

Figure 16:
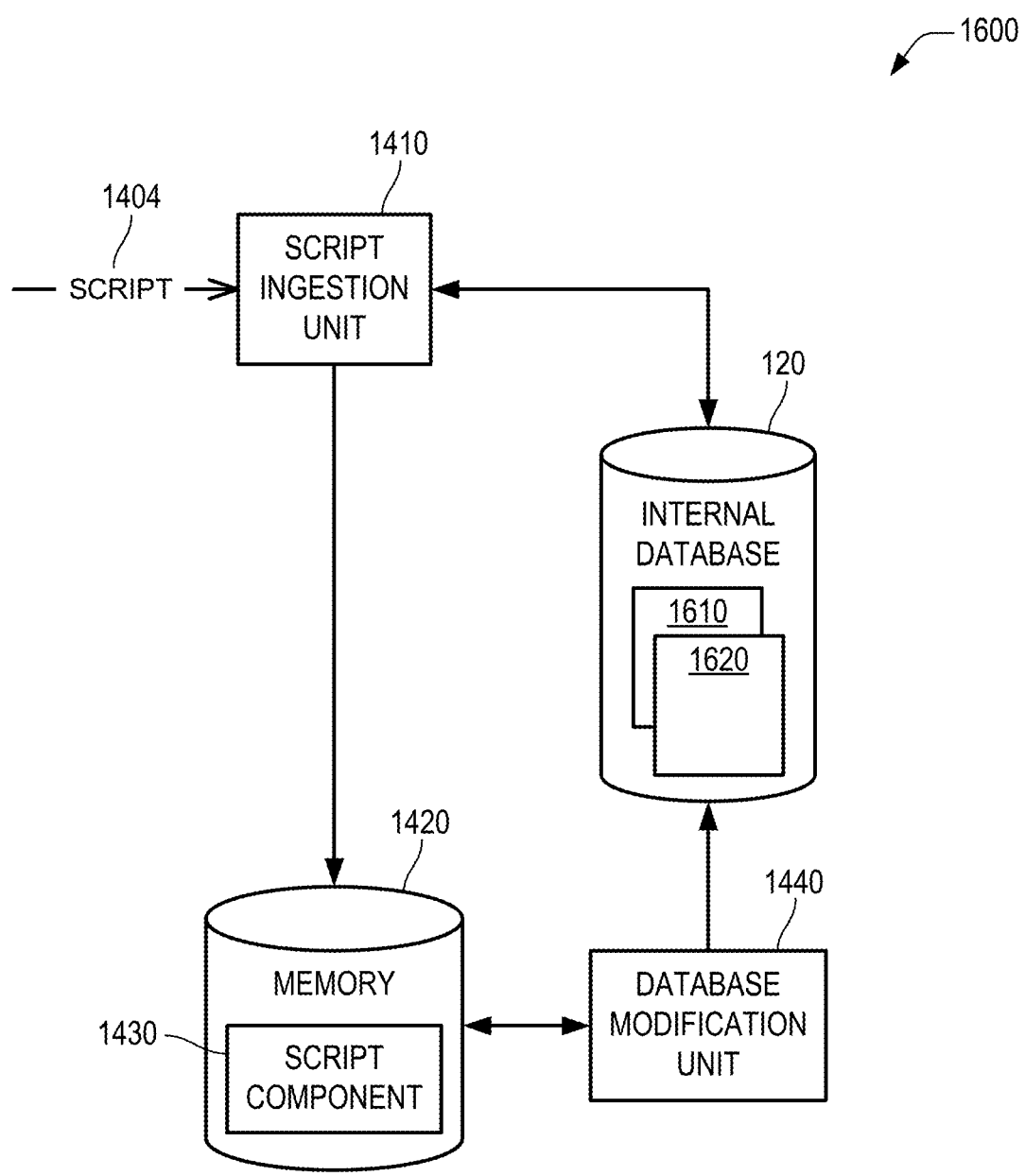
FIG. 16 is a schematic block diagram of another example system for database modification using a script component.

Besides modifying an extant database by modifying a table that defines a hypercube, in some cases, the database modification unit 1440 can generate a table in response to executing the script component 1430. The table that is generated can constitute a new hypercube (which also can be referred to as secondary hypercube). In one embodiment, as is illustrated in FIG. 16, the data modification unit 1440 can execute the script component 1430 using a table 1610 (e.g., an extant hypercube) as input data. By executing the script component 1430, the database modification unit 1440 can generate a second table 1620.

Accordingly, in response to executing the script component 1430, the hypercube (e.g., the PrimaryCube) can be used as an operand for one or more transformations that can yield additional row(s), additional column(s), and/or additional table(s). The additional table(s) can constitute additional hypercubes that can be retained in the internal database 120.

Simply for purposes of illustration, in one example, the script 1404 can permit extending the range of an existing field. Such an example script 1404 can be defined as follow,

```
Concatenate (PrimaryCube) Load
   Date(Today( ) + RecNo( )) as OrderDate
   Autogenerate 30;
```

The foregoing example script 1404 can add 30 extra days to the OrderDate, which then could be used for forecast calculations.

In another example, the script 1404 can permit creating an additional dimension. For instance, if "Customer" is the field used as dimension in the PrimaryCube, the example script 1404 can separate each customer on a respective row. Accordingly, the number of rows in the hypercube (e.g., table 1610 (FIG. 16)) can increase. Such an example script 1404 can be defined as follow,

```
NewPrimaryCube :
Load
  Pick(IterNo( ), 'Case A', 'Case B', 'Case C') as CaseDim,
  *
Resident ObjectHyperCube
While IterNo( ) <= 3;
```

-continued

```
Drop Table PrimaryCube ;
Rename Table NewPrimaryCube To PrimaryCube;
```

In the foregoing example, the While statement loops three times on each input record. Further, "Drop" and "Rename" statements may seem unnecessary, but such statements can permit creating a new table rather than modifying an extant table.

Another example of the script 1404 that can avoid the use of the "Drop" and "Rename" statement can include the keyword "Replace," while accomplishing the same transformation. Specifically, that other example script 1404 can be,

```
Replace (PrimaryCube) Load
  Pick(IterNo( ), 'Case A', 'Case B', 'Case C') as CaseDim,
  *
Resident PrimaryCube
While IterNo( ) <= 3;
```

As mentioned, measures are different from dimensions in that a measure preserves the number of rows in a hypercube. A measure can embody an extra column. The following is an example of the script 1404 that can yield a new measure in response to the corresponding script component 1430 being executed:

```
Replace (PrimaryCube) Load
  <Expression1> as Measure1,
  <Expression2> as Measure2,
  *
Resident PrimaryCube ;
```

A script 1404 and the corresponding script component 1430 can provide several other functionalities. For instance, in one aspect, the script 1404 can support LOAD and at least some ETL operations for single matrices, such as line autogenerate, inline operations, field transformations, and macro expansions. More specifically, in some cases, those ETL operations can include masking operations. It is noted that embodiments of this disclosure avoid authentication and outer join operations commonly performed in a ETL pipeline. As a result, embodiments described herein can modify a hypercube without relying on the implementation of time-intensive operations commonly implemented in an ETL pipeline.

Figure 17A:
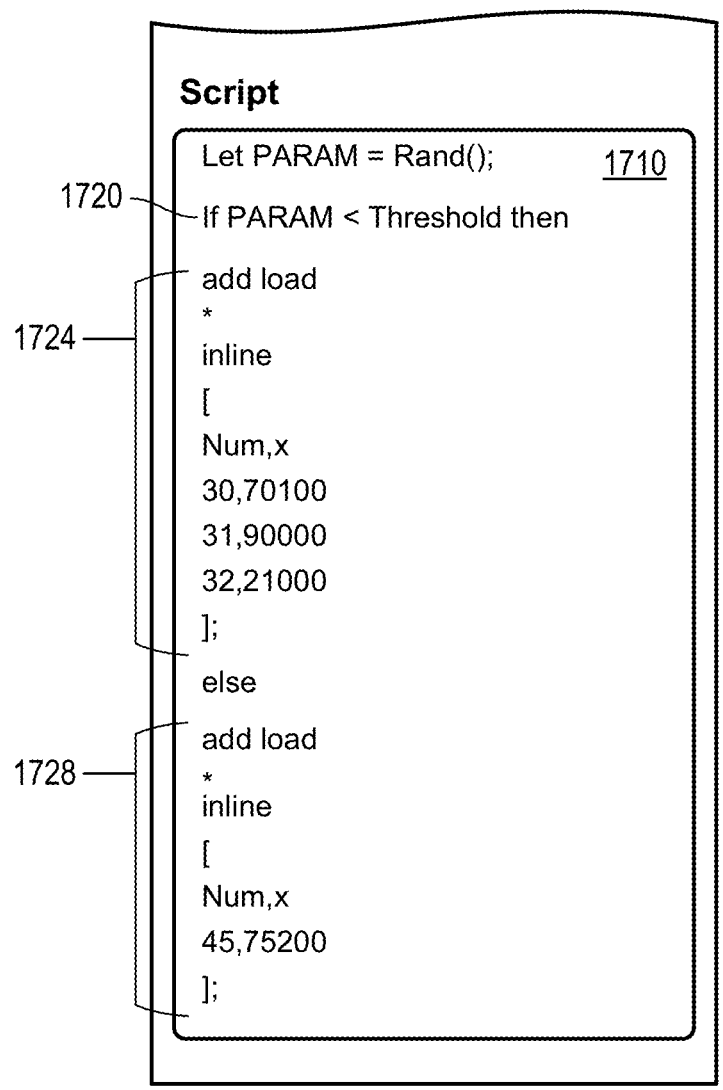
FIG. 17A illustrates an example of a script that includes a control statement.

Further, or in yet another aspect, the script 1404 can support control statements, such as "if . . . then . . . else" statements, "while" loops, "for" loops, a combination thereof, or similar statements. The control statements can permit controlling transformation(s) of a hypercube (e.g., PrimaryCube). As an illustration, FIG. 17A presents an example of a script 1404 that includes an if . . . then . . . else control statement. The example of the script 1404 is shown in a pane 1710 that can be presented in response to selection of the selectable visual element 1534 (FIG. 15).

Execution of the script component 1430 corresponding to the example of the script 1404 shown in the pane 1710 can cause a particular transformation to a hypercube based on control flow dictated by the if statement 1720. Specifically, a first transformation 1724 can add three rows corresponding to a first dimension and a second dimension. Each one of the rows having a defined 2-tuple. The first dimension and the second dimension are respectively represented by "Num"

and "x," for the sake of nomenclature. A second transformation 1728 can add a single row corresponding to the first dimension and the second dimension. The disclosure is not limited to transformations that apply to two dimensions of the hypercube. Indeed, in some cases, a transformation can apply to any number of dimensions, and that number can be based on control flow dictated by an if statement or another type of control statement.

In addition, or in another aspect, after a hypercube (e.g., the PrimaryCube) has been defined, the script 1404 can support matrix operations on that hypercube. That is, the hypercube can be operated upon as if the hypercube was a matrix. That matrix can be formed by the table that constitutes the hypercube—namely, the table resulting from selection of dimension(s) or measure(s), or a combination of both, responsive to selection of the selectable visual element 1514 and/or the selectable visual element 1524. Accordingly, a field (and associated one or more indices) that is present in the hypercube can be used as input to a particular operation cast as a matrix operation or another type of operation. In one example, the particular operation can defined a measure that can be added to the hypercube. By supporting matrix operations, a script and associated script component can be permit transforming a table using linear algebra.

As an example, FIG. 17B illustrates a script 1730 to determine the first derivative of a first dimension with respect to a second dimension using a defined array operation. The first derivative can define a measure that is added to an extant table as a new column. Values of the first derivative can be determined via the defined array operation, where the first and second dimensions can be represented as respective arrays and, thus, values of the first dimension and the second dimension are indexed. Simply for the sake of illustration, the measure is denoted by "FDD," the first dimension is denoted by "Sum_exp1" and the second dimension is denoted by "Num." Further, an index denoted by J is used to represent the first and second dimensions as respective arrays.

As another example, FIG. 17C illustrates a script 1760 to determine an integral of a first dimension over a second dimension using a defined array operation. The integral can define a measure that is added to an extant table as a new column. Values of the integral can be determined via the defined array operation, where the first and second dimensions can be represented as respective arrays and, thus, values of the first dimension and the second dimension are indexed. Simply for the sake of illustration, the measure is denoted by "SimpsonRule," the first dimension is again denoted by "Sum_exp1," and the second dimension is again denoted by "Num." The index denoted by J is again used to represent the first and second dimensions as respective arrays.

Further, or in yet another aspect, the script 1404 can support subroutine definitions. Specifically, the script 1404 can include a "call" control statement that, in response to execution of the associated script component 1430, can perform a function call to a defined subroutine. Here, a subroutine can refer to a native set of one or more operations, a user-defined set of one or more operations (such as matrix operations or another type of array operations), a server-side extension defining a set of one or more operations. Each one of the native set of operation(s), the user-defined set of operation(s), and the set of operation(s) can include, in some embodiments, at least one multicolumn operation or at least one multirow operation, or a combination of both.

As an example, call control statements can have the following format: call name ([paramlist]), where "name" is the name of the subroutine and "paramlist" can be a comma-separated list of actual parameters to be supplied to the subroutine. Each item in that list can be a dimension (or a field), a variable, or a parameter. A user-defined subroutine can be defined within a script 1404, in response to selection of the selectable visual element 1534, in some cases. In other cases, a native subroutine can embody a native function (that is, a function defined within the script engine 104 (FIG. 1)) and the script 1404 can include one or several single calls to respective native functions.

Figure 18:
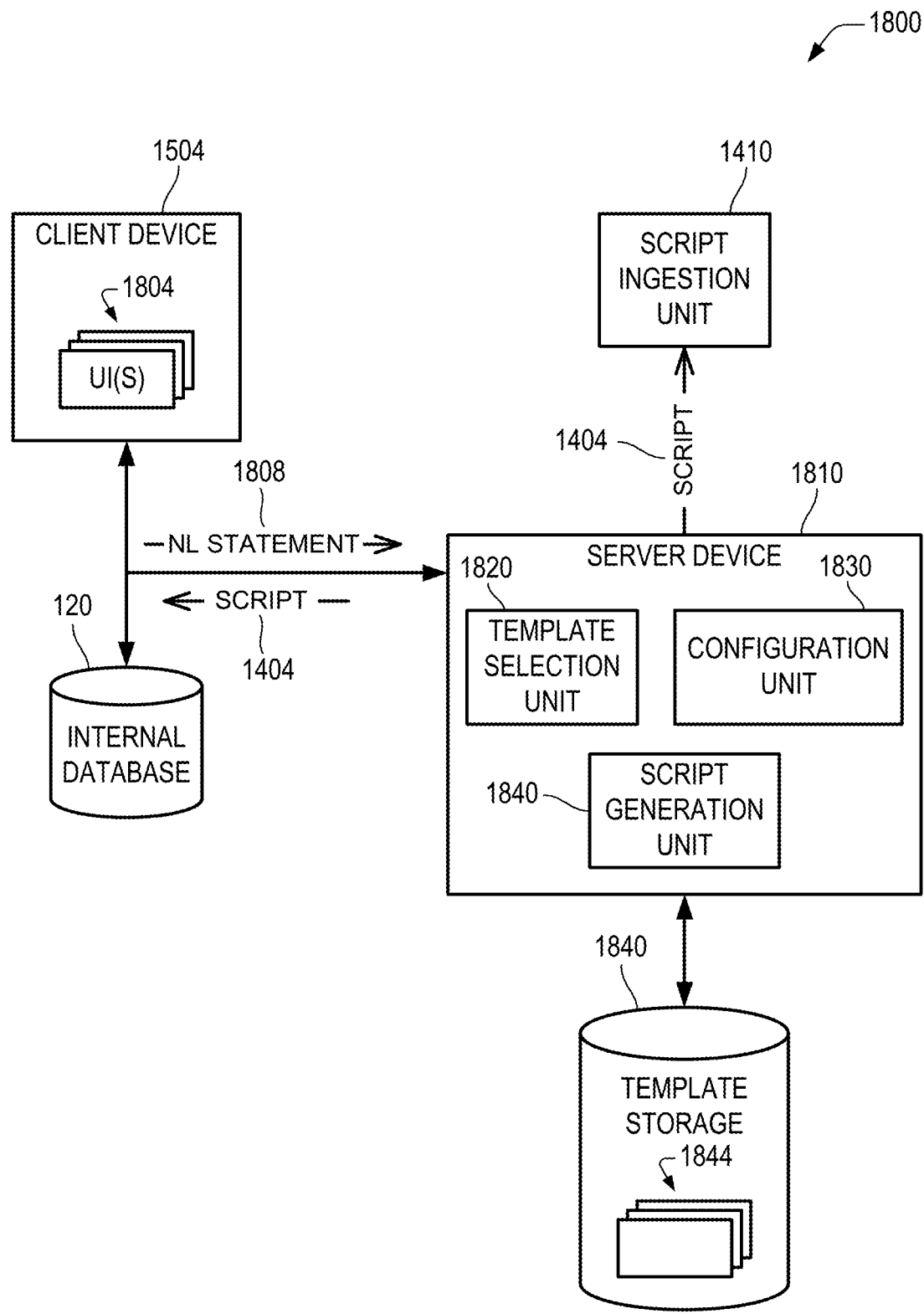
FIG. 18 is a schematic block diagram of an example system for automated supply of a script that can be used to modify a database.

In some embodiments, a script can be generated automatically. FIG. 18 is a schematic block diagram of an example system 1800 for automated supply of a script that can be used to modify a database, in accordance with one or more embodiments of this disclosure. The example system can include the client device 1504 that can present a particular user interface (not depicted in FIG. 18) that permits receiving input information defining a natural language (NL) statement 1808. That particular user interface can be one of several user interfaces 1804 that can be presented by the client device 1504. The display device that is intergrated into, or functionally coupled to, the client device 1504 can present the particular user interface.

The NL statement 1808 can permit generating particular data using an extant table originating from an extant hypercube. The extant table can be, for example, table 1610 (FIG. 16) and the extant hypercube can be denoted as PrimaryCube in some examples herein. That particular data can be used to modify the extant hypercube by modifying the extant table. In one example, a measure can be added to the extant table. The measure can be forecasted revenue and, thus, the NL statement 1808 can be "Forecast sales revenue for three years."

The client device 1504 can send the NL statement 1808 to a server device 1810. The server device 1810 can be include a template selection unit 1820 that can obtain a script template using the NL statement 1808. The script template can be obtained from one or more memory devices 1840 (referred to as template storage 1840). The template storage 1840 can contain a library of multiple script templates 1844. In some embodiments, the template selection unit 1820 can obtain the script template by identifying one or several script templates that match the input statement. To that end, the template selection unit 1820 can determine one or several solutions to a matching algorithm using the NL statement 1808 as a search query and the library of multiple script templates as a search space. Each one of the solution(s) defining a script template.

An example of a script template retained in such a library is illustrated in FIG. 19. The example script template 1900 shown in FIG. 19 provides time series forecasting, and permits the addition of a column (denoted "Forecast") to a hypercube. In FIG. 19, the column that can be added is denoted by "Forecast" and the hypercube is denoted by "PrimaryCube." The example script template 1900 includes a first metavariable (represented by "$F1"), a second metavariable (represented by "$F2"), and a third metavariable (represented by "$Target1"). The template selection unit 1820 can obtain the example template script 1900 in response to receiving a statement such as "Forecast sales revenue for three years."

With further reference to FIG. 18, the server device 1810 also can include a configuration unit 1830 that can identify a group of fields that can be suitable for the script template corresponding to the NL statement 1808. The group of fields is present in the data model that defines the extant table originating from the extant hypercube. The configuration unit 1830 can assign each field in the group of fields to respective metavariables included in the script template. To that end, in some cases, the configuration unit 1830 can generate a mapping between the group of fields and the respective metavariables. Specifically, for each field in the group of fields, the configuration unit 1830 can create a logical association that maps the field to a metavariable in the script template. The one or more logical associations represent the mapping.

The server device 1810 can include a script generation unit 1840 that can generate the script 1404 using the script template and the group of fields. The script generation unit 1840 can send the script 1404 to the script ingestion unit 1410.

The script configuration 1830 also can cause the client device 1504 to present a user interface including the generated script 1404. That user interface can be one of the user interfaces 1804, and can be presented by the display device integrated into, or functionally coupled to, the client device 1504. The script 1404 can be presented in a pane or another type of user element that permits editing the script 1404.

Figure 20:
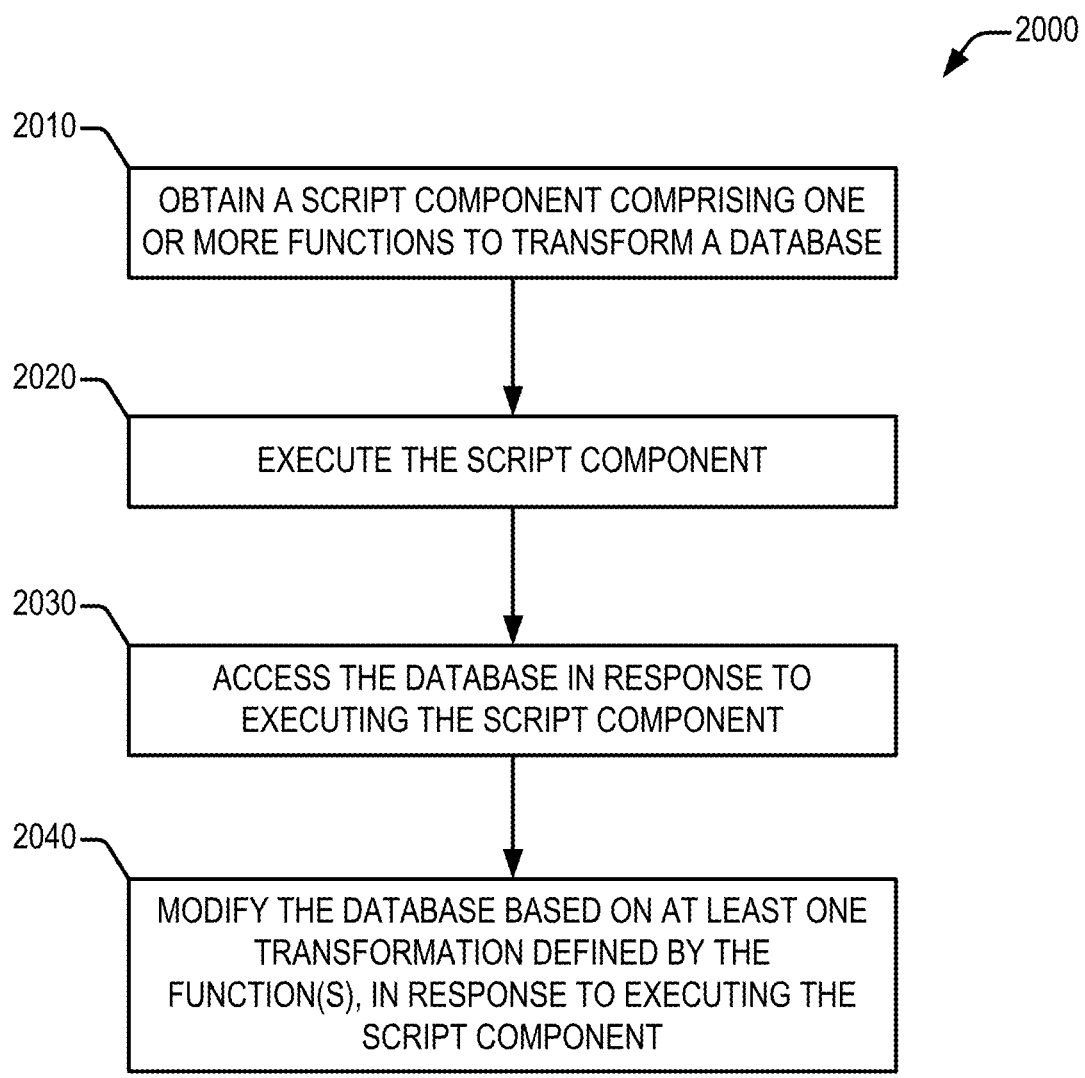
FIG. 20 is a flow chart illustrating an example method.

FIG. 20 illustrates an example of a method 2000 for modifying a database, in accordance with one or more embodiments of the disclosure. The example method 2000 can be implemented, entirely or in part, by a computing system having, or being functionally coupled to, one or more processors, one or more memory devices, and/or other computing resources. In some embodiments, the computing system can comprise the units and data storage of the example system 1400 (FIG. 14).

At operation 2010, the computing system can obtain a script component comprising one or more functions to transform a database. As an example, a first function of the one or more functions can comprise a script statement including a LOAD statement, a JOIN statement, or a CONCATENATE statement. As described herein, other functions can be contemplated. In some embodiments, obtaining the script component can comprise receiving the script component by means of a user interface (UI). In some cases, the user interface can comprise a command-line prompt, and receiving the script component can include receiving input information defining the one or more functions in a single command line.

The script component that is obtained can be stored in data storage included in the computing system. In one example, the script component can be embodied in the script component 1430, and the database can be embodied in the internal database 120 (FIG. 1)). In addition, the data storage can be embodied in, or can constitute, the memory 1420. In some cases, the database can be configured as one of a visible hypercube data structure or a hidden hypercube data structure.

At operation 2020, the computing system can execute the script component. In some embodiments, the computing system can include a unit (such as the database modification unit 1440 (FIG. 14)) that can execute the script component. As mentioned, in some cased, the database modification unit 1440 can include hardware (e.g., a processor or similar data processing device) that can execute the script component 1440.

At operation 2030, the computing system can access the database in response to executing the script component.

At operation 2040, the computing system can modify the database based on at least one transformation defined by the function(s), in response to executing the script component.

Accordingly, in response to executing the script component, the database can be used as input for one or more transformations that lead to additional rows, additional columns, and/or additional databases.

Although not illustrated in FIG. 20, in some embodiments, the example method 2000 can include generating a second database in response to executing the script component. The second database can be configured as one of a visible hypercube data structure or a hidden hypercube data structure.

Figure 21:
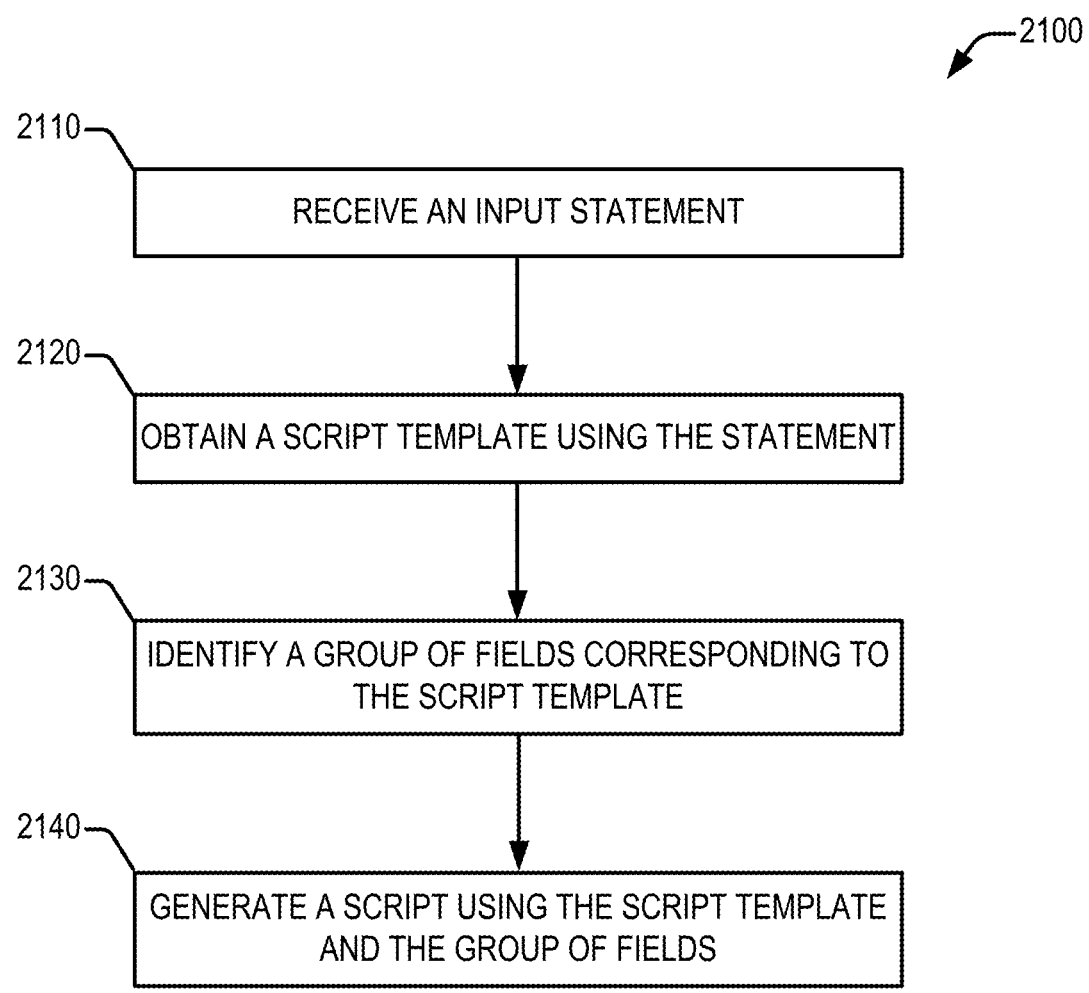
FIG. 21 is a flow chart illustrating another example method.

FIG. 21 illustrates an example of a method 2100 for providing a script to modify a database, in accordance with one or more embodiments of the disclosure. The example method 2100 can be implemented, entirely or in part, by a computing system having, or being functionally coupled to, one or more processors, one or more memory devices, and/or other computing resources. In some embodiments, the computing system can comprise the units and data storage of the example system 1800 (FIG. 18).

At operation 2110, the computing system can receive an input statement that conveys a desired type of manipulation (e.g., a transformation or another type of postprocessing) of an extant hypercube. As mentioned, in some embodiments, the input statement can be an NL statement.

At operation 2120, the computing system can obtain a script template using the statement. The script template can be obtained from data storage containing a library of multiple script templates, for example. In order to obtain the script template, the computing system can determine one or several script templates that match the input statement. To that end, the computing system can determine one or several solutions to a matching algorithm using the input statement as a search query and the library of multiple script templates as a search space. In some embodiments, the data storage can be embodied in the template storage 1840 (FIG. 18)) and such a library can contain the library of multiple script templates 1844 (FIG. 18).

At operation 2130, the computing system can identify a group of fields corresponding to the script. The group of fields is present in the data model that defines the extant hypercube, and can be suitable for the script template.

At operation 2140, the computing system can generate a script using the script template and the group of variables.

Figure 22:
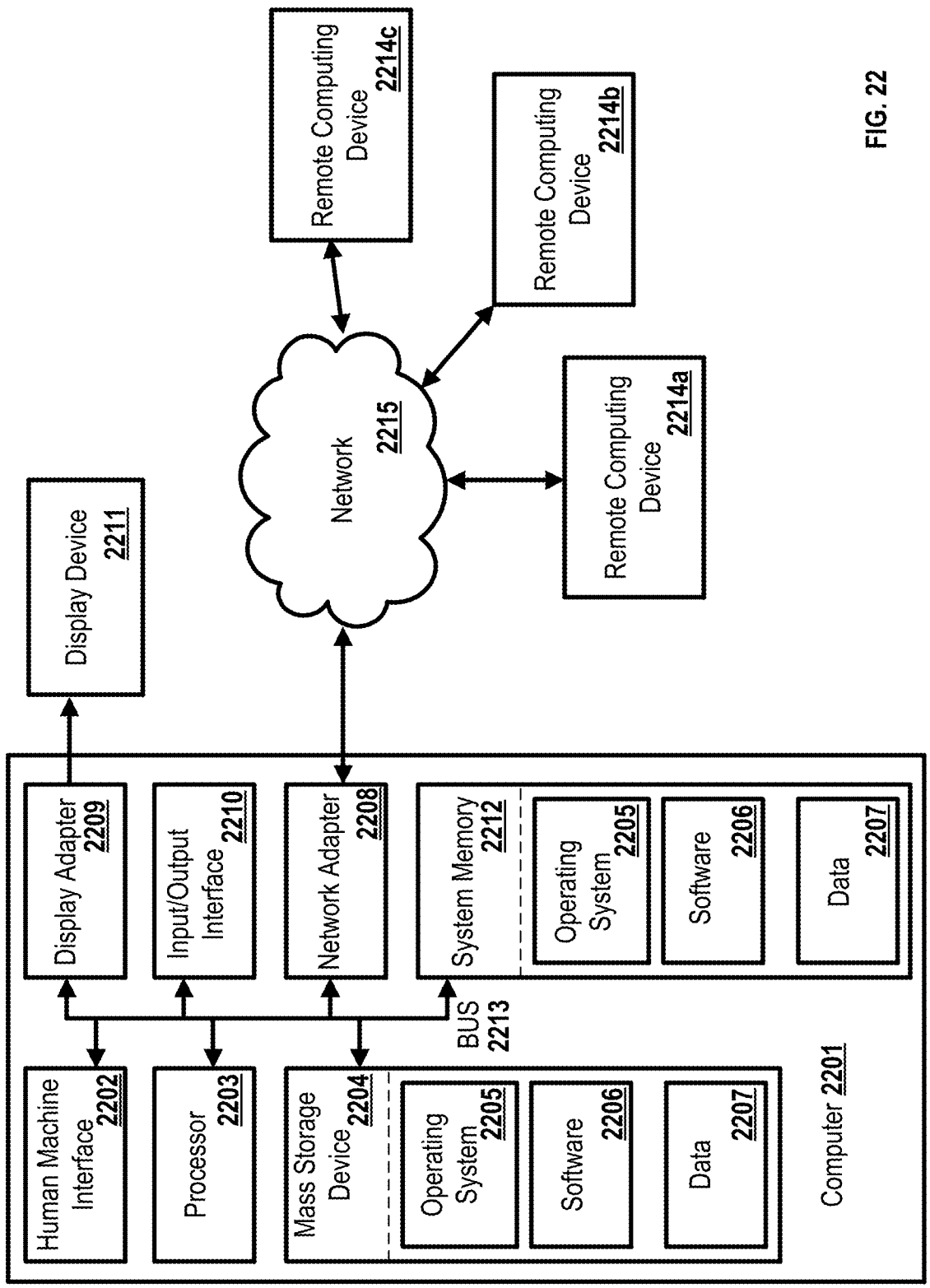
FIG. 22 is an exemplary operating environment for performing the disclosed methods.

In an exemplary aspect, the methods and systems of this disclosure can be implemented on a computer 2201 as illustrated in FIG. 22 and described below. Similarly, the methods and systems disclosed can utilize one or more computers to perform one or more functions in one or more locations. FIG. 22 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2201. The components of the computer 2201 can comprise, but are not limited to, one or more processors 2203, a system memory 2212, and a system bus 2213 that couples various system components including the one or more processors 2203 to the system memory 2212. The system can utilize parallel computing.

The system bus 2213 represents one or more of several possible types of bus structures, including a memory bus or memory controller, a peripheral bus, an accelerated graphics port, or local bus using any of a variety of bus architectures. The bus 2213, and all buses specified in this description can also be implemented over a wired or wireless network connection and each of the subsystems, including the one or more processors 2203, a mass storage device 2204, an operating system 2205, software 2206, data 2207, a network adapter 2208, the system memory 2212, an Input/Output Interface 2210, a display adapter 2209, a display device 2211, and a human-machine interface 2202, can be contained within one or more remote computing devices 2214*a, b,c* at physically separate locations, connected through buses of this form, in effect implementing a fully distributed system.

The computer 2201 typically comprises a variety of computer-readable media. Exemplary readable media can be any available media that is accessible by the computer 2201 and comprises, for example and not meant to be limiting, both volatile and non-volatile media, removable and non-removable media. The system memory 2212 comprises computer readable media in the form of volatile memory, such as random access memory (RAM), and/or non-volatile memory, such as read only memory (ROM). The system memory 2212 typically contains data such as the data 2207 and/or program modules such as the operating system 2205 and the software 2206 that are immediately accessible to and/or are presently operated on by the one or more processors 2203. In some embodiments, the data 2207 can comprise one or a combination of the script component 1430 or the library of multiple script templates 1844.

In another aspect, the computer 2201 can also comprise other removable/non-removable, volatile/non-volatile computer storage media. By way of example, FIG. 22 illustrates the mass storage device 2204 which can provide non-volatile storage of computer code, computer readable instructions, data structures, program modules, and other data for the computer 2201. For example and not meant to be limiting, the mass storage device 2204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2204, including by way of example, the operating system 2205 and the software 2206. Each of the operating system 2205 and the software 2206 (or some combination thereof) can comprise elements of the programming and the software 2206. The data 2207 can also be stored on the mass storage device 2204. The data 2207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In some embodiments, the software 2206 can comprise one or more of a script engine, a logical inference engine, a calculation engine, an extension engine, and/or a rendering engine. In addition, or in other embodiments, the software 2206 can comprise an external engine and/or an interface to the external engine. Further, or in yet other embodiments, the software 2206 can comprise one or a combination of the script ingestion unit 1410, the database modification unit 1440, the template selection unit 1820, the configuration unit 1830, the script generation unit 1840.

In another aspect, the user can enter commands and information into the computer 2201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 2203 via the human-machine interface 2202 that is coupled to the system bus 2213, but can be connected by other interface and bus structures, such as a parallel port, game port, an IEEE 1394 Port (also known as a Firewire port), a serial port, or a universal serial bus (USB).

In yet another aspect, the display device 2211 can also be connected to the system bus 2213 via an interface, such as the display adapter 2209. It is contemplated that the computer 2201 can have more than one display adapter 2209 and the computer 2201 can have more than one display device 2211. For example, the display device 2211 can be a monitor, an LCD (Liquid Crystal Display), or a projector. In addition to the display device 2211, other output peripheral devices can comprise components such as speakers (not shown) and a printer (not shown) which can be connected to the computer 2201 via the Input/Output Interface 2210. Any operation and/or result of the methods can be output in any form to an output device. Such output can be any form of visual representation, including, but not limited to, textual, graphical, animation, audio, tactile, and the like. The display device 2211 and computer 2201 can be part of one device, or separate devices.

The computer 2201 can operate in a networked environment using logical connections to one or more remote computing devices 2214*a,b,c*. By way of example, a remote computing device can be a personal computer, portable computer, smartphone, a server, a router, a network computer, a peer device or other common network node, and so on. Logical connections between the computer 2201 and a remote computing device 2214*a,b,c* can be made via a network 2215, such as a local area network (LAN) and/or a general wide area network (WAN). Such network connections can be through the network adapter 2208. The network adapter 2208 can be implemented in both wired and wireless environments. In an aspect, one or more of the remote computing devices 2214*a,b,c* can comprise an external engine and/or an interface to the external engine.

For purposes of illustration, application programs and other executable program components such as the operating system 2205 are illustrated herein as discrete blocks, although it is recognized that such programs and components reside at various times in different storage components of the computing device 2201, and are executed by the one or more processors 2203 of the computer. An implementation of the software 2206 can be stored on or transmitted across some form of computer-readable media. Any of the disclosed methods can be performed by computer readable instructions embodied on computer-readable media. Computer-readable media can be any available media that can be accessed by a computer. By way of example and not meant to be limiting, computer-readable media can comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of operations or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
    generating, by a computing system comprising at least one processor, in response to at least one user interface selection of at least one dimension of a data model and at least one measure, a hypercube data structure, wherein the generated hypercube data structure is based on an existing hypercube data structure, wherein the data model defines the existing hypercube data structure, and wherein the at least one user interface selection defines a natural language (NL) statement and a scope of the data model;
    determining, by the computing system, and in response to the at least one user interface selection, a script component associated with the NL statement, wherein the script component comprises one or more functions to modify the generated hypercube data structure; and
    modifying, by the computing system, the generated hypercube data structure based on at least one transformation defined by the one or more functions in response to determining the script component, wherein the generated hypercube data structure, after being modified, retains the scope of the data model.

2. The method of claim 1, further comprising generating, using the generated hypercube data structure as an operand, a second hypercube data structure in response to determining the script component.

3. The method of claim 2, wherein the second hypercube data structure is configured as one of a visible hypercube data structure or a hidden hypercube data structure.

4. The method of claim 1, wherein the generated hypercube data structure is one of a visible hypercube data structure or a hidden hypercube data structure.

5. The method of claim 1, wherein the script component comprises a first script template of a plurality of script templates, and wherein determining the script component comprises determining, based on the plurality of script templates, that the first script template matches the NL statement.

6. The method of claim 1, wherein the user interface comprises a command-line prompt, and wherein the method further comprises receiving input data defining the one or more functions in a single command line.

7. The method of claim 1, wherein a first function of the one or more functions comprises a script statement including a LOAD statement, a JOIN statement, or a CONCATENATE statement.

8. One or more computer-readable non-transitory media storing processor-executable instructions that, in response to execution by at least one processor, cause a computing system to:
    generate, in response to at least one user interface selection of at least one dimension of a data model and at least one measure, a hypercube data structure, wherein the generated hypercube data structure is based on an existing hypercube data structure, wherein the data model defines the existing hypercube data structure, and wherein the at least one user interface selection defines a natural language (NL) statement and a scope of the data model;
    determine, in response to the at least one user interface selection, a script component associated with the NL statement, wherein the script component comprises one or more functions to modify the generated hypercube data structure; and modify the generated hypercube data structure based on at least one transformation defined by the one or more functions in response to determining the script component, wherein the generated hypercube data structure, after being modified, retains the scope of the data model.

9. The one or more computer-readable non-transitory media of claim 8, further comprising further processor-executable instructions that, in response to execution by the at least one processor, further cause the computing system to generate, using the generated hypercube data structure as an operand, a second hypercube data structure in response to determining the script component.

10. The one or more computer-readable non-transitory media of claim 9, wherein the second hypercube data structure is configured as one of a visible hypercube data structure or a hidden hypercube data structure.

11. The one or more computer-readable non-transitory media of claim 8, wherein the generated hypercube data structure is configured as one of a visible hypercube data structure or a hidden hypercube data structure.

12. The one or more computer-readable non-transitory media of claim 8, wherein the script component comprises a first script template of a plurality of script templates, and wherein the processor-executable instructions that cause the computing system to determine the script component further cause the computing system to determine, based on the plurality of script templates, that the first script template matches the NL statement.

13. The one or more computer-readable non-transitory media of claim 8, wherein the user interface comprises a command-line prompt, and wherein the processor-executable instructions further cause the computing system to receive input data defining the one or more functions in a single command line.

14. A computing system, comprising:
at least one processor; and
at least one computer-readable non-transitory storage medium having computer-executable instructions stored thereon that, in response to execution by the at least one processor, cause the computing system to,
generate, in response to at least one user interface selection of at least one dimension of a data model and at least one measure, a hypercube data structure, wherein the generated hypercube data structure is based on an existing hypercube data structure, wherein the data model defines the existing hypercube data structure, and wherein the at least one user interface selection defines a natural language (NL) statement and a scope of the data model;

determine, in response to the at least one user interface selection, a script component associated with the NL statement, wherein the script component comprises one or more functions to modify the generated hypercube data structure; and modify the generated hypercube data structure based on at least one transformation defined by the one or more functions in response to determining the script component, wherein the generated hypercube data structure, after being modified, retains the scope of the data model.

15. The computing system of claim 14, the at least one computer-readable non-transitory storage medium having further computer-executable instructions stored thereon that, in response to execution by the at least one processor, further cause the computing system to generate, using the generated hypercube data structure as an operand, a second hypercube data structure in response to determining the script component.

16. The computing system of claim 15, wherein the second hypercube data structure is configured as one of a visible hypercube data structure or a hidden hypercube data structure.

17. The computing system of claim 14, wherein the generated hypercube data structure is configured as one of a visible hypercube data structure or a hidden hypercube data structure.

18. The computing system of claim 14, wherein the script component comprises a first script template of a plurality of script templates, and wherein the computer-executable instructions that cause the computing system to determine the script component further cause the computing system to determine, based on the plurality of script templates, that the first script template matches the NL statement.

19. The computing system of claim 14, wherein the user interface comprises a command-line prompt, and wherein the computer-executable instructions further cause the computing system to receive input data defining the one or more functions in a single command line.

20. The computing system of claim 14, wherein a first function of the one or more functions comprises a script statement including a LOAD statement, a JOIN statement, or a CONCATENATE statement.

* * * * *